US008327327B2

(12) United States Patent
Bierhoff et al.

(10) Patent No.: US 8,327,327 B2
(45) Date of Patent: Dec. 4, 2012

(54) METHOD FOR STATICALLY CHECKING AN OBJECT-ORIENTED COMPUTER PROGRAM MODULE

(75) Inventors: Kevin M. Bierhoff, Pittsburgh, PA (US); Jonathan Aldrich, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1007 days.

(21) Appl. No.: 12/077,830

(22) Filed: Mar. 21, 2008

(65) Prior Publication Data
US 2008/0313613 A1 Dec. 18, 2008

Related U.S. Application Data

(60) Provisional application No. 60/919,252, filed on Mar. 21, 2007.

(51) Int. Cl.
*G06F 9/44* (2006.01)
(52) U.S. Cl. ........................................ 717/116
(58) Field of Classification Search ........... 707/999.009; 717/136, 141, 106, 726, 116; 713/157
See application file for complete search history.

(56) References Cited

U.S. PATENT DOCUMENTS

| | | | |
|---|---|---|---|
| 5,555,412 A | 9/1996 | Besaw et al. | |
| 5,628,005 A * | 5/1997 | Hurvig | 1/1 |
| 5,878,427 A * | 3/1999 | Waheed et al. | 1/1 |
| 5,987,252 A | 11/1999 | Leino et al. | |
| 6,173,444 B1 | 1/2001 | Archambault | |
| 6,353,925 B1 | 3/2002 | Stata et al. | |
| 6,442,753 B1 * | 8/2002 | Gerard et al. | 717/170 |
| 6,813,761 B1 | 11/2004 | Das et al. | |
| 6,978,443 B2 | 12/2005 | Flanagan et al. | |
| 7,024,661 B2 | 4/2006 | Leino et al. | |
| 7,120,902 B2 | 10/2006 | Flanagan et al. | |
| 2002/0046393 A1 | 4/2002 | Leino et al. | |
| 2002/0112201 A1 | 8/2002 | Flanagan et al. | |
| 2002/0133806 A1 | 9/2002 | Flanagan et al. | |
| 2003/0131284 A1 | 7/2003 | Flanagan et al. | |
| 2004/0139370 A1 * | 7/2004 | Bailey et al. | 714/38 |
| 2004/0205742 A1 | 10/2004 | Das et al. | |
| 2005/0066319 A1 | 3/2005 | DeLine et al. | |

(Continued)

FOREIGN PATENT DOCUMENTS
EP 398645 A2 * 11/1990
(Continued)

OTHER PUBLICATIONS

John Boyland, "Checking Interference with FractionalPermissions", Static Analysis Symposium 2003.*

(Continued)

*Primary Examiner* — Wei Zhen
*Assistant Examiner* — Daxin Wu
(74) *Attorney, Agent, or Firm* — Jones Day

(57) ABSTRACT

A method for statically checking an object-oriented computer program module includes the step of identifying objects within a computer program module, at least one of the objects having a plurality of references thereto, possibly from multiple clients. A discipline of permissions is imposed on the objects identified within the computer program module. The permissions enable tracking, from among a discrete set of changeable states, a subset of states each object might be in. A determination is made regarding whether the imposed permissions are violated by a potential reference to any of the identified objects. The results of the determination are output to a user.

22 Claims, 10 Drawing Sheets

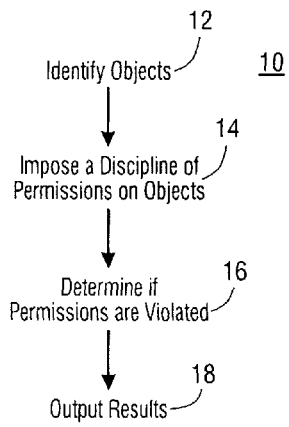

U.S. PATENT DOCUMENTS

| | | | |
|---|---|---|---|
| 2005/0076331 | A1 | 4/2005 | Das et al. |
| 2005/0081192 | A1 | 4/2005 | DeLine et al. |
| 2006/0123412 | A1 | 6/2006 | Hunt et al. |
| 2006/0123424 | A1 | 6/2006 | Hunt et al. |
| 2006/0155905 | A1* | 7/2006 | Leino et al. ............ 710/243 |
| 2006/0200794 | A1 | 9/2006 | Robertson et al. |
| 2006/0236305 | A1 | 10/2006 | Chang et al. |
| 2006/0236311 | A1 | 10/2006 | Chang et al. |
| 2006/0271917 | A1 | 11/2006 | Das et al. |
| 2007/0074188 | A1 | 3/2007 | Huang et al. |
| 2007/0094495 | A1 | 4/2007 | Hunt et al. |
| 2007/0106975 | A1 | 5/2007 | DeLine |
| 2007/0169019 | A1 | 7/2007 | Leino et al. |
| 2007/0271594 | A1 | 11/2007 | Wobber et al. |
| 2007/0282841 | A1* | 12/2007 | Sreedhar ............ 707/9 |
| 2008/0005750 | A1 | 1/2008 | Hunt et al. |
| 2008/0270838 | A1* | 10/2008 | Dorai et al. ............ 714/38 |

FOREIGN PATENT DOCUMENTS

| | | | |
|---|---|---|---|
| JP | 10214191 A | * | 8/1998 |
| WO | WO 02084481 A1 | * | 10/2002 |

OTHER PUBLICATIONS

"Run-time evaluation of opportunities for object inlining in Java", Hendren et al., 2002 ACM, JGI'02, Nov. 3-5, 2002, Seattle, Washington, USA.*

"Codesign from cospecification", Woo et al., IEEE, Jan. 1994"Special issue: aliasing in object-oriented systems", Noble et al., ECOOP'99 Workshops, LNCS 1743, 1999.*

"Verification of object-oriented programs with invariants", Barnett et al., Journal of Object Technology, vol. 3, No. 6, Jun. 2004.*

"MGA: rule-based specification of active object-oriented database applications", Sawyer et al., Research report, University of Lancaster 1994.*

Chin, Wei-Ngan, Khoo, Siau-Cheng, Qin, Shengchao, Popeea, Corneliu, Nguyen, Huu Hai; Verifying Safety Policies with Size Properties and Alias Controls; International Conference on Software Engineering; pp. 186-195; 2005.

Girard, Jean-Yves; Linear Logic; Theoretical Computer Science, 50; pp. 1-102; 1987.

Ball, Thomas, Rajamani, Sriram; Automatically Validating Temporal Safety Properties of Interfaces; Procedures of the 8th SPIN Workshop; pp. 101-122; 2001.

Bierhoff, Kevin; Iterator Specification with Typestates; In 5th International Workshop on Specification and Verification of Component-Based Systems; pp. 79-82; 2006.

Bierhoff, Kevin; Aldrich, Jonathan; Lightweight Object Specification with Typestates; Joint European Software Engineering Conference and ACM Symposium on the Foundation of Software Engineering; pp. 217-226; 2005.

Bierhoff, Kevin, Aldrich, Jonathan; Modular Typestate Verification of Aliased Objects; Technical Report CMU-ISRI-07-105; Carnegie Mellon University; 2007.

Boyland, John, Retert, William; Connecting Effects and Uniqueness with Adoption; ACM Symposium on Principles of Programming Languages; pp. 283-295; 2005.

Chaki, Sagar, Clarke, Edmund, Groce, Alex, Jha, Somesh, Vieth, Helmut; Modular Verification of Software Components in C; International Conference on Software Engineering; pp. 385-395; 2003.

Chin, W., Khoo, S., Qin, S., Popeea, C., Nguyen, H.; Verifying Safety Policies with Size Properties and Alias Controls; International Conference on Software Engineering; pp. 186-195; 2005.

Cousot, Patrick, Cousot, Radhia; Abstract Interpretation: A Unified Lattice Model for Static Analysis of Programs by Construction or Approximation of Fixpoints; ACM Symposium on Principles of Programming Languages; pp. 238-252; 1977.

Degen, Markus, Thiemann, Peter, Wehr, Stefan; Tracking Linear and Affine Resources with Java(X); European Conference on Object-Oriented Programming; 2007.

Deline, Robert, Fahndrich, Manuel; Enforcing High-Level Protocols in Low-Level Software; ACM Conference on Programming Languages Design and Implementation; pp. 59-69; 2001.

Deline, Robert, Fahndrich, Manuel; Typestates for Objects; European Conferenece on Object-Oriented Programming; pp. 465-490; 2004.

Fahndrich, Manuel, Deline, Robert; Adoption and Focus: Practical Linear Types for Imperative Programming; ACM Conference on Programming Language Design and Implementation; pp. 13-24; 2002.

Fahndrich, Manuel, Leino, K. Rustan; Heap Monotonic Typestates; International Workshop on Aliasing, Confinement and Ownership in Object-Oriented Programming; 2003.

Fink, Stephan, Yahav, Evan, Dor, Nurit, Ramalingam, G., Geay, Emmanuel; Effective Typestate Verification in the Presence of Aliasing; ACM International Symposium on Software Testing and Analysis; pp. 133-144; 2006.

Flanagan, Cormac, Leino, K. Rustanl Lillibridge, Mark, Nelson, Greg, Saxe, James, Stata, Raymie; Extended Static Checking for Java; ACM Conferenece on Programming Language Design and Implementation; pp. 234-245; 2002.

Foster, Jeffrey, Terauchi, Tachio, Aiken, Alex; Flow-Sensitive Type Qualifiers; ACM Conference on Programming Language Design and Implementation; pp. 1-12; 2002.

Giannakopoulou, Dimitra, Pasareaunu, Corina, Cobleigh, Jamieson; Assume-Guarantee Verification of Source Code with Design-Level Assumptions; International Conference on Software Engineering; pp. 211-220; 2004.

Girard, J.; Linear Logic; Theoretical Computer Science, 50; pp. 1-102; 1987.

Hallem, Seth, Chelf, Benjamin, Xie, Yichen, Engler, Dawson; A System and Language for Building System-Specific, Static Analyses; ACM Conference on Programming Language Design and Implementation; pp. 69-82; 2002.

Harel, David; Statecharts: A Visual Formalism for Complex Systems; Science of Computer Programming, 8; pp. 231-274; 1987.

Henzinger, Thomas, Jhala, Ranjit, Majumdar, Rupak, Sutre, Gregoire; Lazy Abstraction; ACM Symposium on Principles of Programming Languages; pp. 58-70; 2002.

Hughes, Graham, Bultan, Tevfik; Interface Grammars for Modular Software Model Checking; ACM International Symposium on Software Testing and Analysis; pp. 39-49; 2007.

Igarashi, Atsushi, Kobayashi, Naoki; Resource Usage Analysis; ACM Symposium on Principles of Programming Languages; pp. 331-342; 2002.

Igarashi, Atsushi, Pierce, Benjamin, Wadler, Philip; Featherweight Java: A Minimal Core Calculus for Java and GJ; ACM Conference on Object-Oriented Programming, Systems, Languages & Applications; pp. 132-146; 1999.

Lam, Patrick, Kuncak, Viktor, Rinard, Martin; Generalized Typestate Checking for Data Structure Consistency; International Conference on Verification, Model Checking and Abstract Interpretation; pp. 430-447; 2005.

Kuncak, Viktor, Lam, Patrick, Zee, Karen, Rinard, Martin; Modular Pluggable Analyses for Data Structure Consistency; IEEE Transactions on Software Engineering, 32(12); 2006.

Leavens, Gary, Baker, Albert, Ruby, Clyde; JML: A Notation for Detailed Design; Ch. 12 in Behavioral Specifications of Businesses and Systems, H. Kilov, B. Rumpe, and I. Simmonds (Eds.); Kluwer Academic Press: Boston, MA; pp. 175-188; 1999.

Leino, K. Rustan; Data Groups: Specifying the Modification of Extended State; ACM Conference on Object-Oriented Programming, Systems, Languages & Applications; pp. 144-153; 1998.

Lincoln, Patrick, Scedrov, Andre; First Order Linear Logic Without Modalities is NEXPTIME-Hard; Theoretical Computer Science, 135; pp. 139-154; 1994.

Liskov, Barbara, Wing, Jeannette; A Behavioral Notion of Subtyping; ACM Transactions on Programming Languages and Systems, 16(6); pp. 1811-1841; 1994.

Mandelbaum, Yitzhak, Walker, David, Harper, Robert; An Effective Theory of Type Refinements; ACM International Conference on Functional Programming; pp. 213-225; 2003.

Nanda, Mangala, Grothoff, Christian, Chandra, Satish; Deriving Object Typestates in the Presence of Inter-Object References; ACM Conference on Object-Oriented Programming, Systems, Languages & Applications; pp. 77-96; 2005.

Ramalingam, G., Warshavsky, Alex, Field, John, Goyal, Deepak, Sagiv, Mooly; Deriving Specialized Program Analyses for Certifying Component-Client Conformance; ACM Conference on Programming Language Design and Implementation; pp. 83-94; 2002.

Smith, Frederick, Walker, David, Morrisett, Greg; Alias Types; European Symposium on Programming; pp. 366-381; 2000.

Strom, Robert, Yemini, Shaula; Typestate: A Programming Language Concept for Enhanced Software Reliability; IEEE Transactions on Software Engineering, 12; pp. 157-171; 1986.

Tan, Gang, Ou, Xinming, Walker, David; Enforcing Resource Usage Protocols Via Scope Methods; International Workshop on Foundations of Object-Oriented Languages; 2003.

Wadler, Philip; Linear Types Can Change the World!; Working Conference on Programming Concepts and Methods; pp. 347-359; 1990.

* cited by examiner

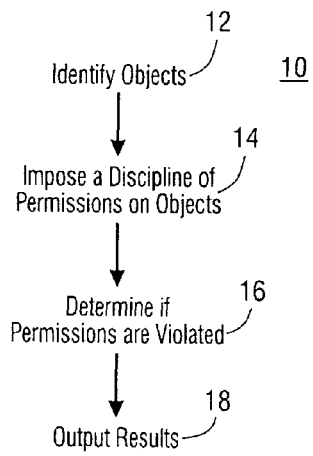

FIG. 1

| Access through other permissions | Current permission has ... | |
|---|---|---|
| | Read/write access | Read-only access |
| None | unique [6] | |
| Read-only | full [3] | immutable [6] |
| Read/write | share [12] | pure [3] |

FIG. 2

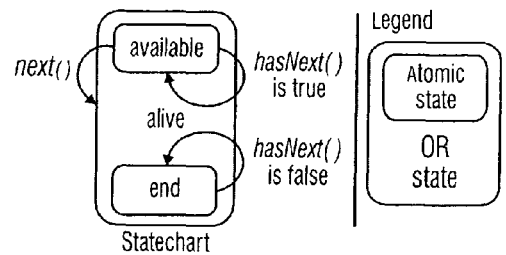

FIG. 3

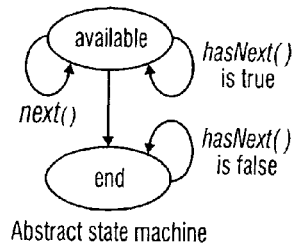

```
Collection c = new ...
Iterator it = c.iterator();           // legal
while(it.hasNext() && ...) {          // legal
    Object o = it.next();             // legal
    Iterator it2 = c.iterator();      // legal
    while(it2.hasNext()) {            // legal
        Object o2 = it2.next();       // legal
        ... }
}
if(it.hasNext() && c.size() == 3) {   // legal
    c.remove(it.next());              // legal
    if(it.hasNext()) ... }            // ILLEGAL
Iterator it3 = c.iterator();          // legal
```

FIG. 4

```
interface Iterator<c : Collection, k : Fract> {
    states available, end refine alive boolean hasNext() :
        pure(this) ⊸ (result = true ⊗ pure(this) in available))
                   ⊕ (result = false ⊗ pure(this) in end)
    Object next() :
        full(this) in available ⊸ full(this)
    void finalize() :
        unique(this) ⊸ immutable(c, k)
} interface Collection {
    void add(Object o) : full(this) ⊸ full(this)
    int size() : pure(this) ⊸ result ≥ 0 ⊗ pure(this)
    // remove(), contains() etc. similar Iterator<this, k> iterator() :
        immutable(this, k) ⊸ unique(result)
}
```

FIG. 5

```
Collection c = new ...                              unique(c)
Iterator it<c, 1/2> = c.iterator();
                            immutable(c, 1/2) ⊗ unique(it)
while(it.hasNext() && ...) {
            immutable(c, 1/2) ⊗ unique(it) in available
    Object o = it.next();
                            immutable(c, 1/2) ⊗ unique(it)
    Iterator it2<c, 1/4> = c.iterator();
            immutable(c, 1/4) ⊗ unique(it) ⊗ unique(it2)
    while(it2.hasNext()) {
    immutable(c, 1/4) ⊗ unique(it) ⊗ unique(it2) in available
        Object o2 = it2.next();
            immutable(c, 1/4) ⊗ unique(it) ⊗ unique(it2)
        ... } // it2 dies
}                           immutable(c, 1/2) ⊗ unique(it)
if(it.hasNext() && c.size() == 3) {
            immutable(c, 1/2) ⊗ unique(it) in available
    c.remove(it.next());  // it dies after next()
                    unique(c) and no permission for it
    if(it.hasNext()) ... }               // ILLEGAL
// it definitely dead               unique(c)
Iterator it3<c, 1/2> = c.iterator();
                            immutable(c, 1/2) ⊗ unique(it3)
```

FIG. 6

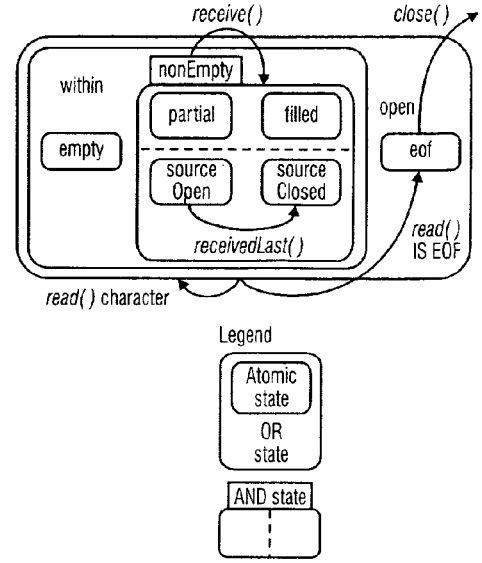

FIG. 7

```
public class PipedOutputStream {
    states raw, open, closed refine alive;
    states ready, sending refine open;

raw     := sink = null
    ready   := half(sink, open)
    sending := sink ≠ null
    closed  := sink ≠ null private PipedInputStream sink;

public PipedOutputStream() :
        1 ⊸ unique(this) in raw { } void connect(PipedInputStream snk) :
        full(this) in raw ⊗ half(snk, open) ⊸
            full(this) in ready
    { sink = snk;                    store permission in field
    }                                full(this) in open public void write(int b) :
        full(this, open) in ready ⊗ b ≥ 0 ⊸ full(this, open) in ready
    {                                half(sink, open) from invariant
        sink.receive(b);             returns half(sink, open)
    }                                full(this, open) in ready public void close() :
        full(this) in ready ⊸ full(this) in closed
    {                                half(sink, open) from invariant
        sink.receivedLast();         consumes half(sink, open)
    }                                full(this) in closed
}
```

FIG. 8

```
class PipedInputStream {
  stream = open, closed refines alive;
  position = within, eof refines open;
  buffer = empty, nonEmpty refines within;
  filling = partial, filled refines nonEmpty;
  source = sourceOpen, sourceClosed refines nonEmpty;
``` empty := $in \leq 0 \otimes closedByWriter = $ false
partial := $in \geq 0 \otimes in \neq out$
filled := $in = out$
sourceOpen := $closedByWriter = $ false
sourceClosed := $closedByWriter \otimes \mathsf{half}(this, \mathsf{open})$
eof := $in \leq 0 \otimes closedByWriter \otimes \mathsf{half}(this, \mathsf{open})$

```
  private boolean closedByWriter = false;
  private volatile boolean closedByReader = false;
  private byte buffer[] = new byte[1024];
  private int in = -1, out = 0;

public PipedInputStream(PipedOutputStream src) :
```
     full($src$) in raw $\multimap$ half($this$, open) $\otimes$ full($src$) in open
```
  { unique(this) in open ⇒ half(this,open) ⊗ half(this,open)
    src.connect(this);       consumes one half(this,open)
  }                          half(this,open) ⊗ full(src) in open synchronized void receive(int b) :
```
     half($this$, open) $\otimes b \geq 0$ $\multimap$ half($this$, open) in nonEmpty
```
  { // standard implementation checks if pipe intact
    while(in == out)                 half(this,open) in filled
      ... // wait a second
                              half(this,open) in empty ⊕ partial
    if(in < 0) { in = 0; out = 0; }
    buffer[in++] (byte)(b & 0xFF);
    if(in >= buffer.length) in = 0;
  }                                  half(this,open) in partial synchronized void receivedLast() :
```
     half($this$, open) $\multimap 1$
```
  { closedByWriter = true; }     this is now sourceClosed public synchronized int read() :
```
     share($this$, open) $\multimap$ ($result \geq 0 \otimes$ share($this$, open))
             $\oplus$ ($result = -1 \otimes$ share($this$, open) in eof)
```
  { ... } // analogous to receive()

public synchronized void close() :
```
     half($this$, open) in eof $\multimap$ unique($this$) in closed
```
  {    half(this,open) from eof invariant ⇒ unique(this,open)
    closedByReader = true;
    in = -1;
  }
}
```

FIG. 9

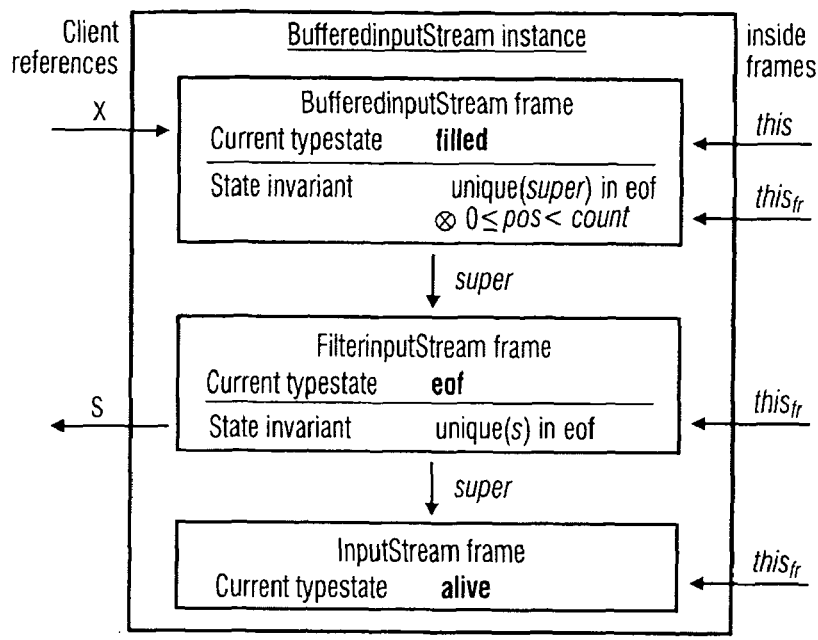

FIG. 10

```
public abstract class InputStream {
  states open, closed refine alive;
  states within, eof refine open;

public abstract int read() :
    share(this_fr, open) ⊸ (result ≥ 0 ⊗ share(this_fr, open))
                  ⊕ (result = −1 ⊗ share(this_fr, open) in eof)
  public abstract void close() :
    full(this_fr, alive) in open ⊸ full(this_fr, alive) in closed public int read(byte[] buf) :
    share(this, open) ⊗ buf ≠ null ⊸
      (result = −1 ⊗ share(this, open) in eof) ⊕
      (result ≥ 0 ⊗ share(this, open))
  { ... for(...)
        ... int c = this.read() ... }
} public class FilterInputStream extends InputStream {
  within := unique(s) in within
  eof := unique(s) in eof
  closed := unique(s) in closed private volatile InputStream s;

protected FilerInputStream(InputStream s)
    unique(s, alive) in open ⊸ unique(this_fr, alive) in open
  { this.s = s; }
  ... // read() and close() forward to s
}
```

FIG. 11

```
public class BufferedInputStream
    extends FilterInputStream {
  states depleted, filled refine within;

closed := unique(super) in closed ⊗ buf = null
  open := unique(buf)
  filled := pos < count ⊗ unique(super) in open
  depleted := pos ≥ count ⊗ unique(super) in within
  eof := pos ≥ count ⊗ unique(super) in in eof private byte buf[] = new byte[8192];
  private int count = 0, pos = 0;

public BufferedInputStream(InputStream s)
      unique(s) in open ⊸ unique(this_fr) in open
  {                        count = pos = 0 ⊗ unique(buf)
    super(s);              unique(super) in open
  }                        unique(this_fr, alive) in open public synchronized int read() {
    if(pos >= count)
    {                      share(this_fr, open) in depleted ⊕ eof
      fill();              share(this_fr, open) in filled ⊕ eof
      if(pos >= count)
        return -1;         returns share(this_fr, open) in eof
    }                      any path: share(this_fr, open) in filled
    return buf[pos++] & 0xFF;
  }                        share(this_fr, open) in filled ⊕ eof private void fill()
      share(this_fr, open) in depleted ⊕ eof ⊸
        share(this_fr, open) in filled ⊕ eof
  {                        invariant: unique(super) in within ⊕ eof
    count = pos = 0;       note: assumes buffer was fully read
    int b = super.read();  unique(super) in within ⊕ eof
    while(b >= 0) {        unique(super) in within
      buf[count++] = (byte) (b & 0xFF);
                           share(this_fr, open) in filled
      if(count >= buf.length) break;
      b = super.read();    unique(super) in within ⊕ eof
    }                      if loop never taken, share(this_fr, open) in eof
  }                        share(this, open) in filled ⊕ eof public synchronized void close() {
    buf = null;            invariant: unique(super) in open
    super.close();         unique(super) in closed
  }                        full(this_fr, alive) in closed
```

FIG. 12

| | | | |
|---|---|---|---|
| programs | PR | ::= | $\langle \overline{CL}, e \rangle$ |
| class decl. | CL | ::= | class C extends C' { $\overline{F}\,\overline{R}\,I\,\overline{N}\,\overline{M}$ } |
| field decl. | F | ::= | $f : T$ in $n$ |
| meth. decl. | M | ::= | $T\,m(\overline{T\,x}) : MS = e$ |
| state decl. | R | ::= | $d = \overline{s}$ refines $s_0$ |
| terms | t | ::= | $x$ \| $o$ \| true \| false |
| | | \| | $t_1$ and $t_2$ \| $t_1$ or $t_2$ \| not $t$ |
| expressions | e | ::= | $t$ \| $f$ \| assign $f := t$ |
| | | \| | new $C(\overline{t})$ \| $t_0.m(\overline{t})$ \| super.$m(\overline{t})$ |
| | | \| | if$(t, e_1, e_2)$ \| let $x = e_1$ in $e_2$ |
| values | v | ::= | $o$ \| true \| false |
| references | r | ::= | $x$ \| $f$ \| $o$ |
| types | T | ::= | $C$ \| bool |
| nodes | n | ::= | $s$ \| $d$ |
| classes | C | fields | $f$ variables $x$ objects $o$ |
| methods | m | states | $s$ dimensions $d$ |

FIG. 13

| | | | |
|---|---|---|---|
| permissions | p | ::= | access$(r, n, g, k, A)$ |
| facts | q | ::= | $t =$ true \| $t =$ false |
| assumptions | A | ::= | $n$ \| $A_1 \otimes A_2$ \| $A_1 \oplus A_2$ |
| fraction fct. | g | ::= | $z$ \| $\overline{n \mapsto v}$ |
| | | \| | $g/2$ \| $g_1, g_2$ |
| fractions | k | ::= | $1$ \| $0$ \| $z$ \| $k/2$ |
| predicates | P | ::= | $p$ \| $q$ |
| | | \| | $P_1 \otimes P_2$ \| $\mathbf{1}$ |
| | | \| | $P_1 \,\&\, P_2$ \| $\top$ |
| | | \| | $P_1 \oplus P_2$ \| $\mathbf{0}$ |
| | | \| | $\exists z : H.P$ \| $\forall z : H.P$ |
| method specs | MS | ::= | $P \multimap E$ |
| expr. types | E | ::= | $\exists x : T.P$ |
| state inv. | N | ::= | $n = P$ |
| initial state | I | ::= | initially $\langle \exists \overline{f : T.P}, S \rangle$ |
| precise state | S | ::= | $s_1 \otimes \ldots \otimes s_n$ |
| fract. terms | h | ::= | $g$ \| $k$ |
| fract. types | H | ::= | Fract \| $\overline{n} \to$ Fract |
| fract. vars. | z | | |

FIG. 15

$$\frac{}{\text{refinements(Object)} = } \qquad \frac{\text{class } C \text{ extends } C' \{\overline{F}\,\overline{R}\,\ldots\} \quad \text{refinements}(C') = \overline{R'}}{\text{refinements}(C) = \overline{R'}, \overline{R}} \qquad \frac{n \text{ in refinements}(C)}{C \vdash n \text{ wf}}$$

$$\frac{C \vdash A_1 \text{ wf} \quad C \vdash A_2 \text{ wf}}{C \vdash A_1 \oplus A_2 \text{ wf}} \quad \frac{C \vdash A_1 \text{ wf} \quad A_1 \,\#\, A_2 \quad C \vdash A_2 \text{ wf}}{C \vdash A_1 \otimes A_2 \text{ wf}} \quad \frac{d = \overline{s} \text{ refines } s \in \text{refinements}(C)}{C \vdash s_i \leq d \quad C \vdash d \leq s} \quad \frac{C \vdash n \text{ wf}}{C \vdash n \leq n}$$

$$\frac{C \vdash n \leq n'' \quad C \vdash n'' \leq n'}{C \vdash n \leq n'} \quad \frac{d = \overline{s} \text{ refines } s^* \in \text{refinements}(C) \quad d' = \overline{s'} \text{ refines } s^* \in \text{refinements}(C) \quad d \neq d'}{C \vdash d \,\#\, d'}$$

$$\frac{C \vdash n_1 \leq n_1' \quad C \vdash n_1' \,\#\, n_2' \quad C \vdash n_2 \leq n_2'}{C \vdash n_1 \,\#\, n_2} \quad \frac{C \vdash A' \,\#\, A}{C \vdash A \,\#\, A'} \quad \frac{C \vdash A_{1,2} \,\#\, A}{C \vdash A_1 \otimes A_2 \,\#\, A} \quad \frac{C \vdash A_{1,2} \,\#\, A}{C \vdash A_1 \oplus A_2 \,\#\, A} \quad \frac{C \vdash n' \leq n}{C \vdash n' \prec n}$$

$$\frac{C \vdash A_{1,2} \prec n \quad C \vdash A_1 \otimes A_2 \text{ wf}}{C \vdash A_1 \otimes A_2 \prec n} \quad \frac{C \vdash A_{1,2} \prec n \quad C \vdash A_1 \oplus A_2 \text{ wf}}{C \vdash A_1 \oplus A_2 \prec n} \quad \frac{C \vdash A \prec n \quad \forall n' : C \vdash A \prec n' \text{ implies } n \leq n'}{C \vdash A \ll n}$$

FIG. 14

$$\frac{\Gamma \vdash t : T \quad \Gamma; \Delta \vdash [t/x]P}{\Gamma; \Delta \vdash^0 t : \exists x : T.P} \text{ P-Term} \qquad \frac{\text{localFields}(C) = \overline{f : T} \quad \Gamma; \Delta \vdash [f_i/x]P}{\Gamma; \Delta \vdash^0_C f_i : \exists x : T_i.P} \text{ P-Field}$$

$$\frac{\Gamma \vdash \overline{t : T} \quad \text{init}(C) = \langle \exists \overline{f : T}.P, A \rangle \quad \Gamma; \Delta \vdash [\overline{t/f}]P}{\Gamma; \Delta \vdash^0 \text{new } C(\overline{t}) : \exists x : C.\text{access}(x, \text{alive}, \{\text{alive} \mapsto 1\}, 1, A)} \text{ P-New}$$

$$\frac{\Gamma \vdash t : \text{bool} \quad (\Gamma, t = \text{false}); \Delta \vdash^j e_2 : \exists x : T.P_2 \setminus \mathcal{E}_2}{\Gamma; \Delta \vdash^{i \vee j} \text{if}(t, e_1, e_2) : \exists x : T.P_1 \oplus P_2 \setminus \mathcal{E}_1 \cup \mathcal{E}_2} \text{ P-If}$$

$$\frac{\Gamma; \Delta \vdash^i e_1 : \exists x : T.P \setminus \mathcal{E}_1 \quad (\Gamma, x : T); (\Delta', P) \vdash^j e_2 : E_2 \setminus \mathcal{E}_2}{i = 1 \text{ implies no temporary assumptions in } \Delta' \quad \text{Fields in } \mathcal{E}_1 \text{ do not occur in } \Delta'}{\Gamma; (\Delta, \Delta') \vdash^{i \vee j} \text{let } x = e_1 \text{ in } e_2 : E_2 \setminus \mathcal{E}_1 \cup \mathcal{E}_2} \text{ P-Let}$$

$$\frac{(\overline{x : T}, \text{this} : C); P \vdash^i_C e : \exists \text{result} : T_r.P_r \otimes \top \setminus \mathcal{E} \quad E = \exists \text{result} : T_r.P_r \quad \text{override}(m, C, \forall \overline{x} : T.P \multimap E)}{T_r \, m(\overline{T \, x}) : P \multimap E = e \text{ ok in } C} \text{ P-Meth}$$

$$\frac{\overline{M} \text{ ok in } C \quad \overline{M} \text{ overrides all methods with this}_{fr} \text{ permissions in } C'}{\text{class } C \text{ extends } C' \, \{ \, \overline{F} \, \overline{R} \, \overline{I} \, \overline{N} \, \overline{M} \, \} \text{ ok}} \text{ P-Class} \qquad \frac{\overline{CL} \text{ ok} \quad \cdot; \cdot \vdash^i e : E \setminus \mathcal{E}}{\langle \overline{CL}, e \rangle : E} \text{ P-Prog}$$

FIG. 16

$$\frac{\text{class } C \text{ extends } C' \, \{\ldots\} \in \overline{CL}}{C \text{ extends } C'} \qquad \frac{\text{class } C \, \{\ldots \, \overline{M} \ldots\} \in \overline{CL} \quad T_r \, m(\overline{T \, x}) : P \multimap \exists \text{result} : T_r.P' = e \in \overline{M}}{\text{mtype}(m, C) = \forall \overline{x} : T.P \multimap \exists \text{result} : T_r.P'}$$

$$\frac{C \text{ extends } C' \quad \text{mtype}(m, C') = \forall \overline{x} : T.MS' \text{ implies } (\overline{x : T}, \text{this} : C); \cdot \vdash MS \multimap MS'}{\text{override}(m, C, \forall \overline{x} : T.MS)} \qquad \frac{\text{class } C \ldots \{\overline{F} \ldots\} \in \overline{CL}}{\text{localFields}(C) = \overline{F}}$$

$$\frac{\text{class } C \text{ extends } C' \, \{\overline{f : T \text{ in } n} \, \overline{S} \text{ initially } \langle \exists \overline{f' : T'}, \overline{f : T.P} \otimes P, A \rangle \ldots \}}{\text{init}(C') = \langle \exists \overline{f' : T'}.P', A' \rangle \quad \cdot; (P, \text{full}(\text{super}, \text{alive}, \{\text{alive} \mapsto 1\}, A')) \vdash \text{inv}_C(A) \otimes \top}{\text{init}(C) = \langle \exists \overline{f' : T'}, \overline{f : T.P} \otimes P, A \rangle}$$

$$\text{init}(\text{Object}) = \langle 1, \text{alive} \rangle$$

$$\frac{\text{class } C \, \{\ldots n = P \ldots\} \in \overline{CL}}{\text{pred}_C(n) = P} \qquad \frac{P = \bigotimes_{n' \leq n'' < n} \text{pred}_C(n'')}{\text{pred}_C(n', n) = P} \qquad \frac{\text{inv}_C(A) = P \Rightarrow n'}{\text{inv}_C(n, A) = P \otimes \text{pred}_C(n', n) \otimes \text{pred}_C(n)}$$

$$\frac{}{\text{inv}_C(n) = 1 \Rightarrow n} \qquad \frac{\text{inv}_C(A_i) = P_i \Rightarrow n_i \quad \text{pred}_C(n_i, n) = P'_i \quad n_1 \otimes n_2 \ll n \quad (i = 1, 2)}{\text{inv}_C(A_1 \otimes A_2) = P_1 \otimes P'_1 \otimes P_2 \otimes P'_2 \Rightarrow n}$$

$$\frac{\text{inv}_C(A_i) = P_i \Rightarrow n_i \quad \text{pred}_C(n_i, n) = P'_i \quad n_1 \oplus n_2 \ll n \quad (i \in 1, 2)}{\text{inv}_C(A_1 \oplus A_2) = (P_1 \otimes P'_1) \oplus (P_2 \otimes \text{pred}_C(n_2, n)) \Rightarrow n}$$

$$\frac{\text{only pure permissions in } P}{\text{effectsAllowed}(P) = 0} \qquad \frac{\text{exists share or full permission in } P}{\text{effectsAllowed}(P) = 1}$$

FIG. 17

$$\text{inv}_C(n, g, k, A) = \text{inv}_C(n, A) \otimes \text{purify}(\text{above}_C(n))$$
$$\text{inv}_C(n, g, 0, A) = \text{purify}(\text{inv}_C(n, A) \otimes \text{above}_C(n))$$
$$\text{where above}_C(n) = \bigotimes_{n':n<n'\leq \text{alive}} \text{pred}_C(n')$$

FIG. 18

$$\frac{\Gamma; \Delta \vdash_C \text{access}(\text{this}_{fr}, n, g, k, A) \quad \text{receiver packed}}{\Gamma; (\Delta, \Delta') \vdash_C^i \text{unpack}(n, k, A) \text{ in } e : E \setminus \mathcal{E}} \text{ P-Unpack}$$
$$k = 0 \text{ implies } i = 0 \quad \Gamma; (\Delta', \text{inv}_C(n, g, k, A), \text{unpacked}(n, g, k, A)) \vdash_C^i e : E \setminus \mathcal{E}$$

$$\frac{\Gamma; \Delta \vdash_C \text{inv}_C(n, g, k, A) \otimes \text{unpacked}(n, g, k, A') \quad k = 0 \text{ implies } A = A'}{\Gamma; (\Delta, \Delta') \vdash_C \text{pack } n \text{ to } A \text{ in } e : E \setminus \overline{f}} \text{ P-Pack}$$
$$\Gamma; (\Delta', \text{access}(\text{this}_{fr}, n, g, k, A)) \vdash_C e : E \setminus \mathcal{E} \quad \text{localFields}(C) = \overline{f : T \text{ in } n} \quad \text{Fields do not occur in } \Delta'$$

$$\frac{\Gamma \vdash t_0 : C_0 \quad \Gamma \vdash \overline{t : T} \quad \Gamma; \Delta \vdash [t_0/\text{this}][t_0/\text{this}_{fr}][\overline{t}/\overline{x}]P}{\Gamma; \Delta \vdash^i t_0.m(\overline{t}) : [t_0/\text{this}][t_0/\text{this}_{fr}][\overline{t}/\overline{x}]E} \text{ P-Call}$$
$$\text{mtype}(m, C_0) = \forall \overline{x : T}.P \multimap E \quad i = \text{effectsAllowed}(P) \quad \text{receiver packed}$$

$$\frac{\Gamma \vdash \overline{t : T} \quad \Gamma; \Delta \vdash [\text{super}/\text{this}_{fr}][\overline{t}/\overline{x}]P \quad C \text{ extends } C'}{\Gamma; \Delta \vdash_C^i \text{super}.m(\overline{t}) : [\text{super}/\text{this}_{fr}][\overline{t}/\overline{x}]E} \text{ P-Super}$$
$$\text{mtype}(m, C') = \forall \overline{x : T}.P \multimap E \quad i = \text{effectsAllowed}(P) \quad \text{receiver packed}$$

$$\frac{\Gamma; \Delta \vdash t : \exists x : T_i.P \quad \Gamma; \Delta' \vdash_C [f_i/x']P' \otimes p}{\Gamma; (\Delta, \Delta') \vdash_C^1 \text{assign } f_i := t : \exists x' : T_i.P' \otimes [f_i/x]P \otimes p \setminus f_i} \text{ P-Assign}$$
$$\text{localFields}(C) = \overline{f : T \text{ in } n} \quad n_i \leq n \quad p = \text{unpacked}(n, g, k, A), k \neq 0$$

FIG. 19

$$\frac{p = \text{access}(r, n, g, k, A)}{\text{purify}(p) = \text{pure}(r, n, g, A)} \quad \frac{\text{purify}(P_1) = P_1' \quad \text{purify}(P_2) = P_2' \quad op \in \{\otimes, \&, \oplus\}}{\text{purify}(P_1 \text{ op } P_2) = P_1' \text{ op } P_2'}$$

$$\frac{\text{unit} \in \{1, \top, 0\}}{\text{purify}(\text{unit}) = \text{unit}} \quad \frac{\text{purify}(P) = P'}{\text{purify}(\exists z : H.P) = \exists z : H.P'} \quad \frac{\text{purify}(P) = P'}{\text{purify}(\forall z : H.P) = \forall z : H.P'}$$

FIG. 20

$$\frac{A = A' = A'' \text{ or } (A = A' \text{ and } A'' = n) \text{ or } (A = A'' \text{ and } A' = n)}{\text{access}(r,n,g,k,A) \Leftarrow\Rightarrow \text{access}(r,n,g/2,k/2,A') \otimes \text{access}(r,n,g/2,k/2,A'')} \text{ SYM}$$

$$\frac{A = A' = A'' \text{ or } (A = A' \text{ and } A'' = n) \text{ or } (A = A'' \text{ and } A' = n)}{\text{access}(r,n,g,k,A) \Leftarrow\Rightarrow \text{access}(r,n,g/2,k,A') \otimes \text{pure}(r,n,g/2,A'')} \text{ ASYM}$$

$$\frac{n_1 \# n_2 \quad A_1 \prec n_1 \leq n \quad A_2 \prec n_2 \leq n \quad p_i = \text{full}(r,n_i,\{g,\text{nodes}(n_i,n) \mapsto 1\}/2, A_i)}{\text{full}(r,n,g,A_1 \otimes A_2) \Rightarrow p_1 \otimes p_2} \text{ F-SPLIT-}\otimes$$

$$\frac{n_1 \# n_2 \quad A_1 \prec n_1 \leq n \quad A_2 \prec n_2 \leq n \quad p_i = \text{full}(r,n_i,\{g,n \mapsto 1,\text{nodes}(n_i,n) \mapsto 1\}/2, A_i)}{p_1 \otimes p_2 \Rightarrow \text{full}(r,n,\{g,n \mapsto 1\}, A_1 \otimes A_2)} \text{ F-JOIN-}\otimes$$

$$\frac{A_1 \# A_2}{\text{full}(r,n,g,A_1 \oplus A_2) \Leftarrow\Rightarrow \text{full}(r,n,g,A_1) \oplus \text{full}(r,n,g,A_2)} \text{ F-}\oplus$$

$$\frac{A \prec n' \leq n}{\text{full}(r,n,g,A) \Rightarrow \text{full}(r,n',\{g,\text{nodes}(n',n) \mapsto 1\}, A)} \text{ F-DOWN}$$

$$\frac{A \prec n' \leq n}{\text{full}(r,n',\{g,n \mapsto 1,\text{nodes}(n',n) \mapsto 1\}, A) \Rightarrow \text{full}(r,n,\{g,n \mapsto 1\}, A)} \text{ F-UP}$$

$$\frac{n' \leq n}{\text{pure}(r,n,\{g,\text{nodes}(n',n) \mapsto \overline{k}\}, A) \Rightarrow \text{pure}(r,n',g,A)} \text{ P-UP}$$

$$\frac{}{\text{access}(r,n,g,k,A) \Rightarrow \text{access}(r,n,g,k,n)} \text{ FORGET}$$

FIG. 21

```
class BufferedInputStream extends FilterInputStream {
states ready, reads refine open; ...
states partial, complete refine filled;

reads := reading; ready := reading = false; ...

private boolean reading; ...

public int read() : ∀k : Fract.... =
unpack(open, k) in
  let r = reading in if(r == false, ... fill() ... )

private bool fill() : ∀k : Fract.
  share(this_fr, open) in depleted ⊕ eof ─∘
    share(this_fr, open) in available ⊕ eof =
unpack(open, k, depleted ⊕ eof) in
  assign count = 0 in assign pos = 0 in
  assign reading = true in
  pack to reads in
    let b = super.read() in
    unpack(open, k, open) in
      let r = reading in assign reading = false in
      assign count = 0 in assign pos = 0 in
      if(r, if(b = -1, pack to eof in false,
            pack to depleted in doFill(b)),
          pack to eof in false)

private bool doFill(int b) : ∀k : Fract.
  share(this_fr, open) in depleted ⊕ partial ─∘
    share(this_fr, open) in partial ⊕ complete =
unpack(open, k, depleted ⊕ partial) in
  let c = count in let buffer = buf in
  assign buffer[c] = b in assign count = c + 1 in
  let l = buffer.length in
  if(c + 1 >= l, pack to complete in true,
    assign reading = true in pack to reads in
      let b = super.read() in unpack(open, k) in
        let r = reading in assign reading = false in
        assign count = c + 1 in assign pos = 0 in
        pack to partial in
          if(r == false || b == -1, true, doFill(b))
```

FIG. 22

METHOD FOR STATICALLY CHECKING AN OBJECT-ORIENTED COMPUTER PROGRAM MODULE

This application claims the benefit of copending U.S. provisional application Ser. No. 60/919,252 filed Mar. 21, 2007, and entitled System for Tracking Typestate in Object-Oriented Languages With Aliasing, which is hereby incorporated in its entirety for all purposes.

GOVERNMENT RIGHTS

This invention was made with government support under NASA Grant No. NNA05CS30A, NSF Grant No. CCF-0546550, and DARPA Contract No. HR00110710019. The government may have certain rights in this invention.

BACKGROUND

In object-oriented software, objects often define usage protocols that clients must follow in order for these objects to work properly. Protocols essentially define legal sequences of method calls. In conventional object-oriented languages, developers have at least three ways of finding out about protocols: reading informal documentation, receiving runtime exceptions that indicate protocol violations, or observing incorrect program behavior as a result of protocol violations that broke internal invariants.

Aliasing, i.e., the existence of multiple references to the same object, is a significant complication in checking whether clients observe a protocol: a client does not necessarily know whether its reference to an object is the only reference that is active at a particular execution point. This also makes it difficult to check whether a class implements its specified protocol because reentrant callbacks through aliases can again lead to unexpected state changes.

Existing protocol checking approaches fall into two categories. They either operate globally, i.e., check an entire code base at once, or severely restrict aliasing. Global analyses typically account for aliasing, but they are not suitable for interactive use during development. Moreover, they do not check whether a declared protocol is implemented correctly, a crucial requirement in object-oriented software where any class might have a protocol of its own.

Modular protocol checkers, like Fugue [12], the first sound modular typestate checker for an object-oriented language, better support developers while they write code: like a typechecker, they check each method separately for protocol violations while assuming the rest of the system to behave as specified. The trade-off, unfortunately, has been that modular checkers require code to follow pre-defined patterns of aliasing. Once a program leaves the realm of supported aliasing, any further state changes are forbidden. Generally speaking, state changes are only allowed where the checker is aware of all references to the changing object.

This approach has serious drawbacks. First, many examples of realistic code might be excluded. Moreover, from a developer's point of view, the boundaries of what a checker supports are hard to predict, and they might not fit with the best implementation strategy for a particular problem. Finally, aliasing restrictions arguably leave developers alone just when they have the most trouble in reasoning about their code, namely, in the presence of subtle aliasing. Thus, a need exists for a method of checking an object-oriented program module having objects having multiple references by code not available for analysis.

SUMMARY

We have developed a sound modular protocol checking approach, based on typestates, that allows a great deal of flexibility in aliasing while guaranteeing the absence of protocol violations at runtime. A main technical contribution is a novel abstraction, access permissions, that combines typestate and object aliasing information. In our methodology, developers express their protocol design intent through annotations based on access permissions. Our checking approach then tracks permissions through method implementations. For each object reference the checker keeps track of the degree of possible aliasing and is appropriately conservative in reasoning about that reference. This helps developers account for object manipulations that may occur through aliases. The checking approach handles inheritance in a novel way, giving subclasses more flexibility in method overriding. Case studies on Java iterators and streams provide evidence that access permissions can model realistic protocols, and protocol checking based on access permissions can be used to reason precisely about the protocols that arise in practice.

One embodiment of our disclosure is directed to a method for statically checking an object-oriented computer program module that includes the step of identifying objects within a computer program module, at least one of the objects having a plurality of references thereto, possibly from multiple clients. A discipline of permissions is imposed on the objects identified within the computer program module. The permissions enable tracking, from among a discrete set of changeable states, a subset of states each object might be in. A determination is made regarding whether the imposed permissions are violated by a potential reference to any of the identified objects. The results of the determination are output to a user.

Another embodiment of our disclosure is directed to a method for statically checking an object-oriented computer program module, comprising identifying objects within a computer program module. The identified objects are partitioned into a plurality of dimensions, each dimension assigned to a client. Each client independently tracks, from among a discrete set of changeable states, a subset of states each object might be in within that client's dimension. A discipline of permissions is imposed in which the operations that a client can invoke involving an object are limited to those operations in which the invoked operation changes the state of the object only in that client's dimension. A determination is made regarding whether the imposed permissions are violated, and the results are output to the user.

Another embodiment of our disclosure is directed to a method for statically checking an object-oriented computer program module, comprising identifying objects within a computer program module. A discipline of permissions is imposed to the objects identified within the computer program module such that for each object, only one client may have read/write permission to the object, track the object's state from among a discrete set of changeable states, and perform any legal operation on the object given the object's current state while all other clients may have read-only access to the object, and can perform only operations that do not affect the object's state and are legal given the client's knowledge of the object's current state. A determination is made regarding whether the imposed permissions are violated, and the results are output to the user.

Another embodiment of our disclosure is directed to a method for statically checking an object-oriented computer program module, comprising identifying objects within a computer program module, where the objects have discrete states that change perceptibly and non-monotonically within a guaranteed state space. A discipline of permissions is imposed to the objects identified within the computer program module such that a plurality of clients can each have a permission that enables tracking a subset of states each object might be in. A determination is made regarding whether the imposed permissions are violated, and the results are output to the user.

Another embodiment of our disclosure is directed to a method for statically checking an object-oriented computer program module, comprising identifying objects within a computer program module, at least one of the objects having a plurality of references thereto. A discipline of permissions is imposed to the objects identified within the computer program module that enables tracking, from among a discrete set of changeable states represented by a hierarchical state machine, a subset of states each object might be in. A determination is made regarding whether the imposed permissions are violated, and the results are output to the user.

Finally, another embodiment of our disclosure is directed to a method for statically checking an object-oriented computer program module, comprising identifying objects within a computer program module, at least one of the objects having a plurality of references thereto. A discipline of permissions is imposed to the objects identified within the computer program module that enables tracking, from among a discrete set of changeable states including a superclass state and a subclass state which may differ, a subset of states each object might be in. A determination is made regarding whether the imposed permissions are violated, and the results are output to the user.

This disclosure proposes a sound modular protocol checking approach, based on typestates, that allows a great deal of flexibility in aliasing. A novel abstraction, access permissions, combines typestate and object aliasing information. Developers express their protocol design intent using access permissions. Our checking approach then tracks permissions through method implementations. For each object reference the checker keeps track of the degree of possible aliasing and is appropriately conservative in reasoning about that reference. A way of breaking an invariant in a frequently used Java standard library class was exposed in this way. The checking approach handles inheritance in a novel way, giving subclasses more flexibility in method overriding. Case studies on Java iterators and streams provide evidence that access permissions can model realistic protocols, and protocol checking based on access permissions can be used to reason precisely about protocols arising in practice. Note that only a fraction of our system's capabilities are needed for any given example (although they all are necessary in different situations). Those, and other advantages and benefits, will become apparent from the detailed description below.

BRIEF DESCRIPTION OF THE FIGURES

For the present disclosure to be readily understood and easily practiced, the present disclosure will now be described, for purposes of illustration and not limitation, in connection with the following figures, wherein:

FIG. 1 is a flow chart illustrating our disclosed method;

FIG. 2 illustrates our access permission taxonomy;

FIG. 3 illustrates a read-only Iterator state machine protocol;

FIG. 4 is an example of a simple Iterator client;

FIG. 5 illustrates a read-only Iterator and partial Collection interface specification;

FIG. 6 is an example verifying a simple Iterator client;

FIG. 7 illustrates a PipedInputStream's state space (inside open);

FIG. 8 illustrates a Java PipedOutputStream (simplified);

FIG. 9 illustrates a Java PipedInputStream (simplified);

FIG. 10 illustrates frames of a BufferedInputStream instance in state filled. The shaded virtual frame is in a different state than its super-frame;

FIG. 11 illustrates a Java FilterInputStream that forwards all calls to underlying InputStream (simplified);

FIG. 12 illustrates how BufferedInputStream caches characters from FilterInputStream base class;

FIG. 13 illustrates an example of core language syntax. Specifications (I, N, MS) in FIG. 15;

FIG. 14 illustrates state space judgments (assumptions A defined in FIG. 15):

FIG. 15 illustrates an example of permission-based specifications;

FIG. 16 Illustrates a permission checking for expressions (part 1) and declarations;

FIG. 17 illustrates protocol verification helper judgments;

FIG. 18 illustrates invariant construction (purify in FIG. 20);

FIG. 19 illustrates permission checking for expressions (part 2);

FIG. 20 illustrates permission purification;

FIG. 21 illustrates splitting and joining of access permission;

FIG. 22 illustrates a fragment of BufferedInputStream from FIG. 12 in core language.

DETAILED DESCRIPTION

1. Introduction

This disclosure will help developers follow protocols while they write code as well as allow developers to correctly and concisely document protocols for their code. We build on our previous work on leveraging typestates [34] for lightweight object protocol specification [4]. Our protocols are state machines that are reminiscent of Statecharts [20].

Turning to FIG. 1, a method 10 for statically checking an object-oriented computer program module according to the present disclosure is illustrated. The method is comprised of step 12 in which objects within a computer program module are identified. At least one of the objects has a plurality of references thereto which may be from independent clients.

In step 14, a discipline of permissions is imposed on the objects identified in step 12. The permissions, discussed in detail below, may be selected from the group consisting of:

a permission allowing a read-only reference to an object, where other references can read and write to the object;

a permission allowing a read/write reference to an object, where all other references to the object are read-only;

a permission allowing a read-only reference to an object, where all other references to the object are also read-only;

a permission allowing a single reference to an object; and a permission allowing a read/write reference to an object, where other references to the object can also be read/write references.

The permissions may be imposed in a manner that allows the permissions to be associated with a fraction of an object. The permissions enable tracking, from among a discrete set of changeable states, a subset of states each object might be in.

Computer programs always describe how objects go from one discrete "state" to another, because computers operate on the very large but still discrete states expressible in their physical memory. Likewise, any formal description of a program will be in terms of such states. The problem here is that "state" is used differently in different contexts. It can refer to all the data associated with an object (or some abstraction thereof), but we mean in this disclosure "abstract" states that are the creation of the programmers which can be organized to describe a finite-state machine. We give programmers the opportunity to write these "abstract" states down and define how objects change from one of these states to another. We do this to capture legal sequences of events (states). Conversely, the actual code describes how the objects' data changes over time. Our method associates each "abstract" state with a description of the data that may be associated with the object in that "abstract" state. Our method tracks what subset of these "abstract" states each object might be in, but it does not directly track how object data changes over time—that is tracked only indirectly, through the description of data associated with each "abstract" state.

It is assumed that the states will change non-monotonically within a guaranteed state space. The states may be represented by a hierarchical state machine. Additionally, objects having a superclass and subclass are allowed to have different states for each.

The method of FIG. 1 continues with step 16 in which a determination is made regarding whether any of the imposed permissions is violated by a potential reference to one of the identified objects. Thereafter, at step 18, the results from step 16 are output.

The method illustrated in FIG. 1 is a sound, modular, typestate checking approach for Java-like object-oriented languages that allows a great deal of flexibility in allowing for aliased objects. For each reference, it tracks the degree of possible aliasing, and is appropriately conservative in reasoning about that reference. This helps developers account for object manipulations that may occur through aliases. High precision in tracking effects of possible aliases together with systematic support for dynamic state tests, i.e., runtime tests on the state of objects, make this approach feasible. Our approach helped expose a way of breaking an internal invariant that causes a commonly used Java standard library class, java. io. BufferedInputStream, to access an array outside its bounds.

The method of FIG. 1 incorporates a novel abstraction, called access permissions (or simply permissions), that combines typestate with aliasing information about objects. Developers use access permissions to express the design intent of their protocols in annotations on methods and classes. Our modular checking approach verifies that implementations follow this design intent.

Access permissions systematically capture different patterns of aliasing (FIG. 2). A permission tracks (a) how a reference is allowed to read and/or modify the referenced object, (b) how the object might be accessed through other references, and (c) what is currently known about the object's typestate.

In particular, our full and pure permissions [3] capture the situation where one reference has exclusive write access to an object (a full permission) while other references are only allowed to read from the same object (using pure permissions). Read-only access through pure permissions is intuitively harmless but to our knowledge has not been exploited in existing modular protocol checkers.

To increase precision of access permissions, we include two additional novel features, which make weak permissions more useful than in existing work. We call permissions "weak" if the referenced object can potentially be modified through other permissions.

Temporary state information can be associated with weak permissions. Our checking approach makes sure that temporary state information is "forgotten" when it becomes outdated.

Permissions can be confined to a particular part of the referenced object's state. This allows separate permissions to independent parts of the same object. It also implies a state guarantee even for weak permissions, i.e., a guarantee that the referenced object will not leave a certain state.

We handle inheritance in a novel way, giving subclasses more flexibility in method overriding. This is necessary for handling realistic examples of inheritance such as Java's BufferedInputStream (details in section 3.2).

We validated the method set forth in FIG. 1 with two case studies, iterators (section 2) and streams (section 3) from Sun's Java standard library implementation. These case studies provide evidence that access permissions can model realistic protocols, and protocol checking based on access permissions can be used to reason precisely about the protocols that arise in practice.

The evaluation herein does establish that our—compared to full-fledged program verification systems [26, 2]—relatively simple method of FIG. 1 can verify code idioms and find errors that no other decidable modular system can. The case studies reflect actual Java standard library protocols and, as far as presently known, cannot be handled by any existing modular protocol verification system.

The following two sections introduce access permissions and a verification approach with examples from our case studies before sections 4 and 5 give a formal account of our approach. Section 6 compares our approach to related work.

2. Read-Only Iterators

This section illustrates basic protocol specification and verification using our approach based on a previous case study on Java iterators [3]. Iterators follow a straightforward protocol but define complicated aliasing restrictions that are easily violated by developers. They are therefore a good vehicle to introduce our approach to handling aliasing in protocol verification. Iterators as presented here cannot be handled by existing modular typestate checkers due to their aliasing restrictions.

2.1 Specification Goals

The material presented in this section models the Iterator interface defined in the Java standard library. For the sake of brevity, we focus on read-only iterators, i.e., iterators that cannot modify the collection on which they iterate. We will refer to read-only iterators simply as "iterators" and qualify full Java iterators as "modifying iterators." In earlier work we showed how to capture full Java iterators [3]. Goals of the presented specification include the following.

Capture the usage protocol of Java iterators.

Allow creating an arbitrary number of iterators over collections.

Invalidate iterators before modification of the iterated collection.

2.2 State Machine Protocol

An iterator returns all elements of an underlying collection one by one. Collections in the Java standard library are lists or sets of objects. Its interface includes methods to add objects, remove objects, and test whether an object is part of the collection. The interface also defines a method iterator that creates a new iterator over the collection. Repeatedly calling next on an iterator returns each object contained in the iterated collection exactly once. The method hasNext determines whether another object is available or the iteration reached its end. It is illegal to call next once hasNext returns false. FIG. 3 illustrates this protocol as a simple state machine.

Notice that hasNext is legal in both states but does not change state. We call hasNext a *dynamic state test*: its return value indicates what state the iterator is currently in. The next section will show how this protocol can be specified.

2.3 Iterator Interface Specification

States Through Refinement. We call the set of possible states of an object its *state space* and define it as part of the object's interface. As suggested above, we can model the iterator state space with two states, available and end. In our approach, states are introduced by refinement of an existing state. State refinement corresponds to OR-states in Statecharts [20] and puts states into a tree hierarchy.

State refinement allows interfaces to, at the same time, inherit their supertypes' or superclass state spaces, define additional (more fine-grained) states, and be properly substitutable as subtypes of extended interfaces [4]. Refinement guarantees that all new states defined in a subtype correspond to a state inherited from the supertype. States form a hierarchy rooted in a state alive defined in the root type Object. Iterators therefore define their state space as follows.

states available, end refine alive;

Typestates do not correspond to fields in a class. They describe an object's state of execution abstractly, and information about fields can be tied to typestates using state invariants (see section 3.1).

Access Permissions Capture Design Intent. Iterators have only two methods, but these have very different behavior. While next can change the iterator's state, hasNext only tests the iterator's state. And even when a call to next does not change the iterator's state, it still advances the iterator to the next object in the sequence. hasNext, on the other hand, is pure: it does not modify the iterator at all.

We use a novel abstraction, *access permissions* ("permissions" for short), to capture this design intent as part of the iterator's protocol. Permissions are associated with object references and govern how objects can be accessed through a given reference [7]. For next and hasNext, we only need two kinds of permissions; more kinds of permissions will be introduced later.

*full* permissions grant read/write access to the referenced object and guarantee that no other reference has read/write access to the same object.

*pure* permissions grant read-only access to the referenced object but assume that other permissions could modify the object.

A distinguished full permission can coexist with an arbitrary number of pure permissions to the same object. This property will be enforced when verifying protocol compliance. In a specification, we write perm(x) for a permission to an object referenced by x, where perm is one of the permission kinds. Access permissions carry state information about the referenced object. For example, "full(this) in available" represents a full permission for an object (this) that is in the available state.

Linear Logic Specifications. Methods can be specified with a state transition that describes how method parameters change state during method execution. We previously argued that existing typestate verification approaches are limited in their ability to express realistic state transitions [4] and proposed to capture method behavior more precisely with logical expressions.

Access permissions represent resources that have to be consumed upon usage—otherwise permissions could be freely duplicated, possibly violating other permissions' assumptions. Therefore, we base our specifications on linear logic [18]. Pre- and post-conditions are separated with a linear implication (−o) and use conjunction ($\hat{x}$) and disjunction ($\oplus$). "Tensor" ($\hat{x}$) corresponds to conjunction, "alternative" ($\oplus$) to disjunction, and "lollie" (−o) to implication in conventional logic. The key difference is that linear logic treats known facts as resources that are consumed when proving another fact. This fits well with our intuition of permissions as resources that give access to objects. In certain cases, internal choice (&, also called additive conjunction) has been useful [3]. These connectives represent the decidable multiplicative-additive fragment of linear logic (MALL).

Iterators illustrate that state transitions are often non-deterministic. For next, we can use an imprecise post-condition and specify next so that it requires a full permission in state available and returns the full permission in the alive state. In a Statechart, this corresponds to transitioning to a state that contains substates (FIG. 3).

full(this) in available −o full(this) in alive

Dynamic state tests (like hasNext) require relating the (Boolean) method result to the state of the tested object (usually the receiver). A disjunction of conjunctions expresses the two possible outcomes of hasNext (FIG. 5) where each conjunction relates a possible method result to the corresponding receiver state. (We adopt the convention that (−o) binds weaker than ($\hat{x}$) and ($\oplus$).)

pure(this) −o (result=true $\hat{x}$ pure(this) in available)
$\oplus$ (result=false $\hat{x}$ pure (this) in end)

These specifications enforce the characteristic hasNext/next call pairing; hasNext determines the iterator's current state. If it returns true then it is legal to call next. The iterator is in an unknown state after next returns, and another hasNext call determines the iterator's new state.

2.4 Creating and Disposing Iterators

Multiple (independent) iterators are permitted for a single collection at the same time. However, the collection must not be modified while iteration is in progress. Standard implementations try to detect such situations of concurrent modification on a best-effort basis. But, ultimately, Java programmers have to make sure on their own that collections are not modified while iterated. (Note that "concurrent" modifications often occur in single-threaded programs [32].)

This section shows how the aliasing constraints between iterators and its collection can be handled. As we will see, this problem is largely orthogonal to specifying the relatively simple protocol for individual iterators that was discussed in the previous section.

Immutable Access Prevents Concurrent Modification. Access permissions can guarantee the absence of concurrent modification. The key observation is that when an iterator is created it stores a reference to the iterated collection in one of its fields. This reference should be associated with a permission that guarantees the collection's immutability while iteration is in progress. We include two previously proposed permissions [6] into our system in order to properly specify collections.

*immutable* permissions grant read-only access to the referenced object and guarantee that no reference has read/write access to the same object.

*unique* permissions grant read/write access and guarantee that no other reference has any access to the object.

Thus immutable permissions cannot co-exist with full permissions to the same object. We can specify the collection's iterator method using these permissions as follows. Notice how it consumes or captures the incoming receiver permission and returns an initial unique permission to a fresh iterator object.

public class Collection {
  Iterator iterator (): immutable(this) −o unique(result)}

It turns out that this specification precisely captures Sun's Java standard library implementation of iterators: Iterators are realized as inner classes that implicitly reference the collection they iterate.

Permission Splitting. Consider a client such as the one in FIG. 4. It gets a unique permission when first creating a collection. Then it creates an iterator which captures an immutable permission to the collection. However, the client later needs more immutable permissions to create additional iterators. Thus, while a unique permission is intuitively stronger than an immutable permission, we cannot just coerce the client's unique permission to an immutable permission and pass it to iterator: it would get captured by the newly created iterator, leaving the client with no permission to the collection at all.

To avoid this problem we use permission splitting in our verification approach. Before method calls we split the original permission into two, one of which is retained by the caller. Permissions are split so that their assumptions are not violated. In particular, we never duplicate a full or unique permission and make sure that no full permission co-exists with an immutable permission to the same object. Some of the legal splits are the following.

unique(x) $\Rightarrow$ full(x)$\otimes$ pure(x)
full(x) $\Rightarrow$ immutable(x)$\otimes$ immutable(x)
immutable(x) $\Rightarrow$ immutable(x)$\otimes$ immutable(x)
immutable(x) $\Rightarrow$ immutable(x)$\otimes$ pure(x)

They allow the example client in FIG. 4 to retain an immutable permission when creating iterators, permitting multiple iterators and reading the collection directly at the same time.

Permission Joining Recovers Modifying Access. When splitting a full permission to a collection into immutable permissions we lose the ability to modify the collection. Intuitively, we would like to reverse permission splits to regain the ability to modify the collection.

Such permission joining can be allowed if we introduce the notion of fractions [6]. Essentially, fractions keep track of how often a permission was split. This later allows joining permissions (with known fractions) by putting together their fractions. A unique permission by definition holds a full fraction that is represented by one (1). We will capture fractions as part of our permissions and write (perm) (x, k) for a given permission with fraction k. We usually do not care about the exact fraction and therefore implicitly quantify over all fractions. If a fraction does not change, we often will omit it. Fractions allow us to define splitting and joining rules as follows:

unique(x, 1) $\Leftrightarrow$ full(x, ½)$\otimes$ pure(x, ½)
full(x, k) $\Leftrightarrow$ immutable(x, k/2)$\otimes$ immutable(x, k/2)
immutable(x, k) $\Leftrightarrow$ immutable(x, k/2)$\otimes$ Immutable(x, k/2)
immutable(x, k) $\Leftrightarrow$ immutable(x, k/2)$\otimes$ pure(x, k/2)

For example, we can split full(it, ½) into full(it, ¼)$\otimes$ pure(it, ¼) and recombine them. Such reasoning lets our iterator client recover a unique iterator permission after each call into the iterator.

Recovering Collection Permissions. Iterators are created by trading a collection permission for a unique iterator permission. We essentially allow the opposite trade as well to modify a previously iterated collection again. We can safely consume a unique iterator permission and recover the permissions to its fields because no reference will be able to access the iterator anymore. A simple live variable analysis can identify when variables with unique permissions are no longer used. (As a side effect, a permission-based approach therefore allows identifying dead objects.)

For lack of a more suitable location, we annotate the finalize method to indicate what happens when an iterator is no longer usable. And to re-establish exactly the permission that was originally passed to the iterator we parameterize Iterator objects with the collection permission's fraction. The finalize specification can then release the captured collection permission from dead iterators. The complete specification for iterators and a partial collection specification are summarized in FIG. 5

2.5 Client Verification

FIG. 6 illustrates how our client from FIG. 4 can be verified by tracking permissions and splitting/joining them as necessary. After each line of code, we show the current set of permissions on the right-hand side of the figure. We recover collection permissions from dead iterators as soon as possible. This lets us verify the entire example client. We correctly identify the seeded protocol violation.

2.6 Summary

We presented a specification of read-only iterators that prevents concurrent collection modification. To this end, it associates collections and iterators with access permissions, defines a simple state machine to capture the iterator usage protocol, and tracks permission information using a decidable fragment of linear logic. Our logic-based specifications can relate objects to precisely specify method behavior in terms of typestates and support reasoning about dynamic tests.

3. Java Stream Implementations

I/O protocols are common examples for typestate-based protocol enforcement approaches [11, 12, 4]. This section summarizes a case study in applying our approach to Java character streams and, in particular, stream pipes and buffered input streams. The section focuses on implementation verification of stream classes, which—to our knowledge—has not been attempted with typestates before. Implementation verification generalizes techniques shown in the previous section for client verification.

3.1 Stream Pipes

Pipes are commonly used in operating system shells to forward output from one process to another process. Pipes carry alphanumeric characters for a source to a sink. The Java I/O library includes a pair of classes, PipedOutputStream and PipedInputStream, that offers this functionality inside Java applications. This section provides a specification for Java pipes and shows how the classes implementing pipes in the Java standard library can be checked using our approach.

Informal Pipe Contract. In a nutshell, Java pipes work as follows: A character-producing "writer" writes characters into a PipedOutputStream (the "source") that forwards them to a connected PipedInputStream (the "sink") from which a "reader" can read them. The source forwards characters to the sink using the internal method receive. The writer calls close on the source when it is done, causing the source to call receivedLast on the sink (FIG. 8).

The sink caches received characters in a circular buffer. Calling read on the sink removes a character from the buffer (FIG. 9). Eventually the sink will indicate, using an end of file token (EOF, −1 in Java), that no more characters can be read. At this point the reader can safely close the sink. Closing the sink before EOF was read is unsafe because the writer may still be active.

The pipe classes in Sun's standard library implementation have built-in runtime checks that throw exceptions in the following error cases: (1) closing the sink before the source, (2) writing to a closed source or pushing characters to the sink after the source was closed, and (3) reading from a closed sink. The specification we present here makes these error cases impossible.

State Space with Dimensions. The source protocol can be modeled with three states: raw, open, and closed. "raw" indicates that the source is not connected to a sink yet. For technical reasons that are discussed below, we refine open into ready and sending. The writer will always find the source in state ready.

For the sink protocol, we again distinguish open and closed. A refinement of open helps capturing read's protocol. The sink is within as long as read returns characters; the eof state is reached when read returns the EOF token. While within, we keep track of the sink's buffer being empty or nonEmpty. We further refine nonempty into partial and filled, the latter corresponding to a full buffer.

At the same time, however, we would like to track whether the source was closed, i.e., whether receivedLast was called. We previously proposed state dimensions to address such separate concerns (here, the buffer filling and the source state) [4] with states that are independent from each other. State dimensions correspond to AND-states in Statecharts [20].

We can simply refine nonEmpty twice, along different dimensions. We call the states for the second dimension sourceOpen and sourceClosed with the obvious semantics. Note that we only need the additional source dimension while the buffer is non Empty; the source is by definition open (closed) in the empty (eof) state. This is only one way of specifying the sink. It has the advantage that readers need not concern themselves with the internal communication between source and sink. To better visualize the sink's state space, FIG. 7 summarizes it as a Statechart.

Shared Modifying Access. Protocols for source and sink are formalized in FIGS. 8 and 9 with specifications that work similar to the iterator example in the last section. However, the sink is conceptually modified through two distinct references, one held by the source and one held by the reader. To capture this, we introduce our last permission.

Share permissions grant read/write access to the referenced object but assume that other permissions have read/write access as well.

Conventional programming languages effectively always use share permissions for mutable state. Interestingly, share permissions are split and joined exactly like immutable permissions. Because share and immutable permissions cannot coexist, our rules force a commitment to either one when initially splitting a full permission.

full(x, k) ⇔ share(x, k/2) ⊗ share(x, k/2)
share(x, k) ⇔ share(x, k/2) ⊗ share(x, k/2)
share(x, k) ⇔ share(x, k/2) ⊗ pure(x, k/2)

State Guarantees. We notice that most modifying methods cannot change a stream's state arbitrarily. For example, read and receive will never leave the open state, and they cannot tolerate other permissions to leave open.

We make this idea part of our access permissions. We include another parameter into permissions that specifies a state guarantee, i.e., a state that cannot be left even by modifying permissions. Thus a state guarantee (also called the permission's root) corresponds to an "area" in a Statechart that cannot be left. As an example, we can write the permission needed for read as share(this, open). Without an explicit state guarantee, only alive is guaranteed (this is what we did for iterators).

State guarantees turn out to be crucial in making share and pure permissions useful because they guarantee a state even in the face of possible changes to the referenced object through other permissions. Moreover, if we combine them with state dimensions, we get independent permissions for orthogonal object aspects that, e.g., let us elegantly model modifying iterators [3].

Explicit Fractions for Temporary Heap Sharing. When specifying the sink methods used by the source (receive and receivedLast), we have to ensure that the source can no longer call the sink after receivedLast so the sink can be safely closed. Moreover, to close the sink, we need to restore a permission rooted in alive. Thus the two share permissions for the sink have to be joined in such a way that there are definitely no other permissions relying on open (such permissions, e.g., could have been split off of one of the share permissions).

We extend the notion of fractions to accomplish this task. We use fractions to track, for each state separately, how many permissions rely on it. What we get is a fraction function that maps guaranteed states (i.e., the permission's root and its super-states) to fractions. For example, if we split an initial unique permission for a PipedInputStream into two share permissions guaranteeing open then these permissions rely on open and alive with a ½ fraction each. (Iterator permissions root in alive and their fraction functions map alive to the given fraction.)

To close the sink, we have to make sure that there are exactly two share permissions relying on open. Fraction functions make this requirement precise. For readability, we use the abbreviation half in FIG. 9 that stands for the following permission.

half(x, open)≡share(x, open, {alive ↦ ½, open ↦ ½})

By adding fractions and moving the state guarantee up in the state hierarchy, the initial permission for the sink, unique (this, alive, {alive ↦ 1}), can be regained from two half(this, open) permissions; half is the only permission with an explicit fraction function. All other specifications implicitly quantify over all fraction functions and leave them unchanged.

State Invariants Map Typestates to Fields. We now have a sufficient specification for both sides of the pipe. To verify their implementations we need to know what typestates correspond to in implementations. Our implementation verification extends Fugue's approach of using state invariants to map states to predicates that describe the fields of an object in a given state [12]. We leverage our hierarchical state spaces and allow state invariants for states with refinements to capture invariants common to all substates of a state.

FIG. 8 shows that the source's state invariants describe its three states in the obvious way based on the field snk pointing to the sink. Notice that the invariant does not only talk about the sink's state (as in Fugue) but uses permissions to control access through fields just as through local variables.

The sink's state invariants are much more involved (FIG. 9) and define, e.g., what the difference between an empty buffer (in <0) and a filled circular buffer (in=out) is. Interestingly, these invariants are all meticulously documented in the original Java standard library implementation for PipedInputStream [4]. The half permission to itself that the sink temporarily holds for the time between calls to receivedLast and close lets us verify that close is allowed to close the sink.

Verification with Invariants. Implementation checking assumes state invariants implied by incoming permissions and tracks changes to fields. Objects have to be in a state whenever they yield control to another object, including during method calls. For example, the source transitions to sending before calling the sink. However, the writer never finds the source in the sending state but always ready-sending never occurs in a method specification. We call states that are not observed by a client intermediate states. They help us deal with re-entrant calls (details in section 5.2). A practical syntax could make such intermediate states implicit.

FIGS. 8 and 9 show how implementation checking proceeds for most of the source's and sink's methods. We show in detail how field assignments change the sink's state. The sink's state information is frequently a disjunction of possible states. Dynamic tests essentially rule out states based on incompatible invariants. All of these tests are present in the original Java implementation; we removed additional non-null and state tests that are obviated by our approach. This not only shows how our approach forces necessary state tests but also suggests that our specifications could be used to generate such tests automatically.

3.2 Buffered Input Streams

A BufferedInputStream (or "buffer," for short) wraps another "underlying" stream and provides buffering of characters for more efficient retrieval. We will use this example to illustrate our approach to handling inheritance. Compared to the original implementation, we made fields "private" in order to illustrate calls to overridden methods using super. We omit intermediate states in this specification.

Class Hierarchy. BufferedInputStream is a subclass of FilterInputStream, which in turn is a subclass of InputStream. InputStream is the abstract base class of all input streams and defines their protocol with informal documentation that we formalize in FIG. 11. It implements convenience methods such as read (int [ ]) in terms of other-abstract-methods. FilterInputStream holds an underlying stream in a field s and simply forwards all calls to that stream (FIG. 11). BufferedInputStream overrides these methods to implement buffering.

Frames. The buffer occasionally calls overridden methods to read from the underlying stream. Our approach is based on Fugue's frames for reasoning about inheritance [12]. Objects are broken into frames, one for each class in the object's class hierarchy. A frame holds the fields defined in the corresponding class. We call the frame corresponding to the object's runtime type the virtual frame, referred to with normal references (including this). Relative to a method, we call the current frame—corresponding to the class that the method is defined in—with $this_{fr}$." and the frame corresponding to the immediate superclass is called super frame. FIG. 10 shows a sample BufferedInputStream instance with its three frames.

Frame Permissions. In our approach, a permission actually grants access to a particular frame. The permissions we have seen so far give a client access to the referenced object's virtual frame. Permissions for other frames are only accessible from inside a subclass through super.

FIG. 10 illustrates that a BufferedInputStream's state can differ from the state its filter frame is in. The filter's state might be eof (when the underlying stream reaches eof) while the buffer's is still within (because the buffer array still holds unread characters). The state invariants in FIG. 12 formalize this. They let us verify that super calls in the buffer implementation respect the filter's protocol.

Because the states of frames can differ it is important to enforce that a permission is only ever used to access fields in the frame it grants permission to. In specifications we specifically mark permissions that will actually access fields (and not just call other methods) of the receiver with $this_{fr}$. We require all methods that use these permissions to be overridden. On the other hand, convenience methods such as read (int [ ]) can operate with permissions to the virtual frame and need not be overridden (FIG. 11).

This distinction implies that fill (FIG. 12) cannot call read (int [ ]) (because it does not have a suitable virtual frame permission) but only super. read( ). This is imperative for the correctness of fill because a dynamically dispatched call would lead back into the—still empty—buffer, causing an infinite loop. (One can trigger exactly this effect in the Java 6 implementation of BufferedInputStream.)

3.3 Summary

This section showed how our approach can be used to verify realistic Java pipe and buffered input stream implementations. The notion of access permissions is central to our approach. Overall, we introduced five different kinds of permissions (FIG. 2). While three kinds are adapted from existing work [7, 12] we recently proposed full and pure permissions [3]. State guarantees and temporary state information increase the usefulness of "weak" (share and pure) permissions. Permission splitting and joining is flexible enough to model temporary aliasing on the stack (during method calls) and in the heap (e.g., in pipes and iterators). Permission-based state invariants enable reasoning about protocol implementations. We handle inheritance based on frames [12] and permit dynamic dispatch within objects for convenience methods.

4. Formal Language

This section formalizes an object-oriented language with protocol specifications. We briefly introduce expression and class declaration syntax before defining state spaces, access permissions, and permission-based specifications. Finally, we discuss handling of inheritance and enforcement of behavioral subtyping.

4.1 Syntax

FIG. 13 shows the syntax of a simple class-based object-oriented language. The language is inspired by Featherweight Java (FJ, [24]); we will extend it to include typestate protocols in the following subsections. We identify classes (C), methods (m), and fields (f) with their names. As usual, x ranges over variables including the distinguished variable this for the receiver object. We use an overbar notation to abbreviate a list of elements. For example, $\overline{x{:}T}=x_1{:}T_1,\ldots,x_n{:}T_n$. Types (T) in our system include Booleans (bool) and classes.

Programs are defined with a list of class declarations and a main expression. A class declaration CL gives the class a unique name C and defines its fields, methods, typestates, and state invariants. A constructor is implicitly defined with the class's own and inherited fields. Fields (F) are declared with their name and type. Each field is mapped into a part of the state space n that can depend on the field (details in section 5.2). A method (M) declares its result type, formal parameters, specification and a body expression. State refinements R will be explained in the next section; method specifications MS and state invariants N are deferred to section 4.4.

We syntactically distinguish pure terms t and possibly effectful expressions e. Arguments to method calls and object construction are restricted to terms. This simplifies reasoning about effects [30, 9] by making execution order explicit.

Notice that we syntactically restrict field access and assignments to fields of the receiver class. Explicit "getter" and "setter" methods can be defined to give other objects access to fields. Assignments evaluate to the previous field value.

4.2 State Spaces

State spaces are formally defined as a list of state refinements (see FIG. 13). A state refinement (R) refines an existing state in a new dimension with a set of mutually exclusive sub-states. We use s and d to range over state and dimension names, respectively. A node n in a state space can be a state or dimension. State refinements are inherited by subclasses. We assume a root state alive that is defined in the root class Object.

We define a variety of helper judgments for state spaces in FIG. 14. refinements (C) determines the list of state refinements available in class C. C|−A wf defines well-formed state assumptions. Assumptions A combine states and are defined in FIG. 15. Conjunctive assumptions have to cover orthogonal parts of the state space. C|–n≦ń defines the substrate relation for a class. C|–A # Á defines orthogonality of state assumptions. A and Á are orthogonal if they refer to different (orthogonal) state dimensions. C|–A≺ n defines that a state assumption A only refers to states underneath a root node n. C|–A<<n finds the tightest such n.

4.3 Access Permissions

Access permissions p give references permission to access an object. Permissions to objects are written access (r, n, g, k, A) (FIG. 15). (We wrote perm(r, n, g) in A before.) The additional parameter k allows us to uniformly represent all permissions as explained below.

Permissions are granted to references r. References can be variables, locations, and fields.

Permissions apply to a particular subtree in the space of r that is identified by its root node n. It represents a state guarantee (section 3). Other parts of the state space are unaffected by the permission.

The fraction function g tracks for each node on the path from n to alive a symbolic fraction [6]. The fraction function keeps track of how often permissions were split at different nodes in the state space so they can be coalesced later (see section 5.5).

The subtree fraction k encodes the level of access granted by the permission. k>0 grants modifying access. k<1 implies that other potentially modifying permissions exist. Fraction variables z are conservatively treated as a value between 0 and 1, i.e., 0<z<1.

A state assumption A expresses state knowledge within the permission's subtree. Only full permissions can permanently make state assumptions until they modify the object's state themselves. For weak permissions, the state assumption is temporary, i.e., lost after any effectful expression (because the object's state may change without the knowledge of r).

We can encode unique, full, share, and pure permissions as follows. In our formal treatment we omit immutable permissions, but it is straightforward to encode them with an additional "bit" that distinguishes immutable and share permissions.

unique(r, n, g) in A≡access(r, n, {g, n↦ 1}, 1, A)
full(r, n, g) in A≡access(r, n, g, 1, A)
share(r, n, g, k) A≡access(r, n, g, k, A) (0<k<1)
pure(n, n, g) in A≡access (r, n, g, 0, A)

4.4 Permission-Based Specifications

We combine atomic permissions (p) and facts about Boolean values (q) using linear logic connectives (FIG. 15). We also include existential (∃z: H.P) and universal quantification of fractions (∀z:H.P) to alleviate programmers from writing concrete fraction functions in most cases. We type all expressions as an existential type (E).

Method specifications. Methods are specified with a linear implication (–o) of predicates (MS). The left-hand side of the implication (method pre-condition) may refer to method receiver and formal parameters. The right-hand side (post-condition) existentially quantifies the method result (a similar technique is used in Vault [11]). We refer to the receiver with this and usually call the return value result.

State invariants. We decided to use linear logic predicates for state invariants as well (N). In general, several of the defined state invariants will have to be satisfied at the same time. This is due to our hierarchical state spaces. Each class declares an initialization predicate and a start state (I) that are used for object construction (instead of an explicit constructor).

4.5 Handling Inheritance

Permissions give access to a particular frame, usually the virtual frame (see section 3.2) of an object. Permissions to the virtual frame are called object permissions. Because of subtyping, the precise frame referenced by an object permission is statically unknown.

references r::= . . . |super|this$_{fr}$.

To handle inheritance, we distinguish references to the receiver's "current" frame (this$_{fr}$) and its super-frame (super). Permissions for these "special" references are called frame permissions. A this$_{fr}$ permission grants access to fields and can be used in method specifications. Permissions for super are needed for super-calls and are only available in state invariants. All methods requiring a this$_{fr}$ permission must be overridden because such methods rely on being defined in a particular frame to access its fields.

4.6 Behavioral Subtyping

Subclasses should be allowed to define their own specifications, e.g., to add precision or support additional behavior [4]. However, subclasses need to be behavioral subtypes [29] of the extended class. Our system enforces behavioral subtyping in two steps. Firstly, state space inheritance conveniently guarantees that states of subclasses always correspond to states defined in superclasses [4]. Secondly, we make sure that every overriding method's specification implies the overridden method's specification [4] using the override judgment (FIG. 17) that is used in checking method declarations. This check leads to method specifications that are contra-variant in the domain and co-variant in the range as required by behavioral subtyping.

5. Modular Typestate Verification

This section describes a static modular typestate checking technique for access permissions similar to conventional typechecking. It guarantees at compile-time that protocol specifications will never be violated at runtime. We emphasize that our approach does not require tracking typestates at run time.

A companion technical report contains additional judgments and a soundness proof for a fragment of the system presented in this disclosure [5]. The fragment does not include inheritance and only supports permissions for objects as a whole. State dimensions are omitted and specifications are deterministic. The fragment does include full, share, and pure permissions with fractions and temporary state information.

5.1 Permission Tracking

We permission-check an expression e with the judgment Γ;Δ⊢$_C^i$e:∃x:T.P\ε. This is read as, "in valid context Γ and linear context Δ, an expression e executed within receiver class C has type T, yields permissions P, and affects fields ε". Permissions Δ are consumed in the process. We omit the receiver C where it is not required for checking a particular syntactic form. The set ε keeps track of fields that were assigned to, which is important for the correct handling of permissions to fields. It is omitted when empty. The marker i in the judgment can be a 0 or 1 where i=1 indicates that states of objects in the context may change during evaluation of the expression. This will help us reason about temporary state assumptions. A combination of markers with iVj is 1 if at least one of the markers is 1.

valid contexts Γ::=•|Γ,x:T|Γ,z:H|Γ,q
linear contexts Δ::=•|Δ,P
effects ε::=•|ε,f Valid and linear contexts distinguish valid (permanent) information (Γ) from resources (Δ). Resources are tracked linearly, forbidding their duplication, while facts can be used arbitrarily often. (In logical terms, contraction is defined for facts only). The valid context types object variables, fraction variables, and location types and keeps track of facts about terms q. Fraction variables are tracked in order to handle fraction quantification correctly. The linear context holds currently available resource predicates.

The judgment Γ⊢t:T types terms. It includes the usual rule for subsumption based on nominal subtyping induced by the extends relation (FIG. 17). Term typing is completely standard and can be found in the companion report. The companion report also includes rules for formally typing fractions and fraction functions [5].

Our expression checking rules are syntax-directed up to reasoning about permissions. Permission reasoning is deferred to a separate judgment Γ;Δ⊢P that uses the rules of linear logic to prove the availability of permissions P in a given context. This judgment will be discussed in section 5.5. Permission checking rules for most expressions appear in FIG. 16 and are described in turn. Packing, method calls, and field assignment are discussed in following subsections. Helper judgments are summarized in FIG. 17. The notation [t/r]e substitutes t for occurrences of r in e.

P-TERM embeds terms. It formalizes the standard logical judgment for existential introduction and has no effect on existing objects.

P-FIELD checks field accesses analogously.

P-NEW checks object construction. The parameters passed to the constructor have to satisfy initialization predicate P and become the object's initial field values. The new existentially quantified object is associated with a unique permission to the root state that makes state assumptions according to the declared start state A. Object construction has no effect on existing objects.

The judgment init (FIG. 17) looks up initialization predicate and start state for a class. The start state is a conjunction of states (FIG. 15). The initialization predicate is the invariant needed for the start state.

P-IF introduces non-determinism into the system, reflected by the disjunction in its type. We make sure that the predicate is of Boolean type and then assume its truth (falsehood) in checking the then (else) branch. This approach lets branches make use of the tested condition.

P-Let checks a let binding. The linear context used in checking the second subexpression must not mention fields affected by the first expression. This makes sure that outdated field permissions do not "survive" assignments or packing. Moreover, temporary state information is dropped if the first subexpression has side effects.

A program consists of a list of classes and a main expression (P-PROG, FIG. 16). As usual, the class table CL is globally available. The main expression is checked with initially empty contexts. The judgment CL ok (P-CLASS) checks a class declaration. It checks fields, states, and invariants for syntactic correctness (omitted here) and verifies consistency between method specifications and implementations using the judgment M ok in C. P-METH assumes the specified pre-condition of a method (i.e., the left-hand side of the linear implication) and verifies that the method's body expression produces the declared post-condition (i.e., the right-hand side of the implication). Conjunction with T drops excess permissions, e.g., to dead objects. The override judgment concisely enforces behavioral subtyping (see section 4.6). A method itself is not a linear resource since all resources it uses (including the receiver) are passed in upon invocation.

5.2 Packing and Unpacking

We use a refined notion of unpacking [12] to gain access to fields: we unpack and pack a specific permission. The access we gain reflects the permission we unpacked. Full and shared permissions give modifying access, while a pure permission gives read-only access to underlying fields.

To avoid inconsistencies, objects are always fully packed when methods are called. To simplify the situation, only one permission can be unpacked at the same time. Intuitively, we "focus" [13] on that permission. This lets us unpack share like full permissions, gaining full rather than shared access to underlying fields (if available). The syntax for packing and unpacking is as follows.

$$\text{expressions } e ::= \ldots | \text{unpack}(n, k, A) \text{ in } e | \text{pack to } A \text{ in } e$$

Packing and unpacking always affects the receiver of the currently executed method. The unpack parameters express the programmer's expectations about the permission being unpacked. For simplicity, an explicit subtree fraction k is part of unpack expressions. It could be inferred from a programmer-provided permission kind, e.g., share.

Typechecking. For pack to work properly we have to "remember" the permission we unpacked. Therefore we introduce unpacked as an additional linear predicate.

$$\text{permissions } p ::= \ldots | \text{unpacked}(n, g, k, A)$$

The checking rules for packing and unpacking are given in FIG. 19. Notice that packing and unpacking always affects permissions to this$_{fr}$. (We ignore substitution of this with an object location at runtime here.)

P-UNPACK first derives the permission to be unpacked. The judgment inv determines a predicate for the receiver's fields based on the permission being unpacked. It is used when checking the body expression. An unpacked predicate is added into the linear context. We can prevent multiple permissions from being unpacked at the same time using a straightforward dataflow analysis (omitted here).

P-PACK does the opposite of P-UNPACK. It derives the predicate necessary for packing the unpacked permission and then assumes that permission in checking the body expression. The new state assumption A can differ from before only if a modifying permission was unpacked. Finally, the rule ensures that permissions to fields do not "survive" packing.

Invariant transformation. The judgment $inv_c(n, g, k, A)$ determines what permissions to fields are implied by a permission access(this$_{fr}$, n, g, k, A) for a frame of class C. It is defined in FIG. 18 and uses a purify function (FIG. 20) to convert arbitrary into pure permissions.

Unpacking a full or shared permission with root node n yields purified permissions for nodes "above" n and includes invariants following from state assumptions as-is. Conversely, unpacking a pure permission yields completely purified permissions.

5.3 Calling Methods

Checking a method call involves proving that the method's pre-condition is satisfied. The call can then be typed with the method's post-condition.

Unfortunately, calling a method can result into reentrant callbacks. To ensure that objects are consistent when called we require them to be fully packed before method calls. This reflects that aliased objects always have to be prepared for reentrant callbacks.

This rule is not a limitation because we can always pack to some intermediate state although it may be inconvenient in practice. Notice that such intermediate packing obviates the need for adoption while allowing focus [13]: the intermediate state represents the situation where an adopted object was taken out of the adopting object. Inferring intermediate states as well as identifying where reentrant calls are impossible (intermediate packing avoidance) are important areas for future research.

Virtual calls. Virtual calls are dynamically dispatched (rule P-CALL). In virtual calls, frame and object permissions are identical because object permissions simply refer to the object's virtual frame. This is achieved by substituting the given receiver for both this and this$_{fr}$.

Super calls. Super calls are statically dispatched (rule P-SUPER). Recall that super is used to identify permissions to the super-frame. We substitute super only for this$_{fr}$. We omit a substitution of this for the receiver (this again) for clarity.

5.4 Field Assignments

Assignments to fields change the state of the receiver's current frame. We point out that assignments to a field do not change states of objects referenced by the field. Therefore reasoning about assignments mostly has to be concerned with preserving invariants of the receiver. The unpacked predicates introduced in section 5.2 help us with this task.

Our intuition is that assignment to a field requires unpacking the surrounding object to the point where all states that refer to the assigned field in their invariants are revealed. Notice that the object does not have to be unpacked completely in this scheme. For simplicity, each field is annotated with the subtree that can depend on it (FIG. 13). Thus we interpret subtrees as data groups [27].

The rule P-ASSIGN (FIG. 19) assigns a given object t to a field $f_i$ and returns the old field value as an existential x'. This preserves information about that value. The rule verifies that the new object is of the correct type and that a suitable full or share permission is currently unpacked. By recording an effect on $f_i$ we ensure that information about the old field value cannot "flow around" the assignment (which would be unsound).

5.5 Permission Reasoning with Splitting and Joining

Our permission checking rules rely on proving a predicate P given the current valid and linear resources, written Γ;Δ⊢P. We use standard rules for the decidable multiplicative-additive fragment of linear logic (MALL) with quantifiers that only range over fractions [28]. Following Boyland [7] we introduce a notion of substitution into the logic that allows substituting a set of linear resources with an equivalent one.

$$\frac{\Gamma;\Delta \vdash P' \quad P' \Rrightarrow P}{\Gamma;\Delta \vdash P} \text{ SUBST}$$

The judgment P ⇛ P' defines legal substitutions. We use substitutions for splitting and joining permissions (FIG. 21). The symbol ⇔ indicates that transformations are allowed in both directions. SYM and ASYM generalize the rules from section 2. Most other rules are used to split permissions for larger subtrees into smaller ones and vice versa. A detailed explanation of these rules can be found in the companion report [5].

Our splitting and joining rules maintain a consistent set of permissions for each object so that no permission can ever violate an assumption another permission makes. Fractions of all permissions to an object sum up to (at most) 1 for every node in the object's state space.

5.6 Example

To illustrate how verification proceeds, FIG. 22 shows the fill method from BufferedInputStream (FIG. 12) written in our core language. As can be seen, we need an intermediate state reads and a marker field reading that indicate an ongoing call to the underlying stream. We also need an additional state refinement to specify an internal method replacing the while loop in the original implementation. (We assume that this$_{fr}$ permissions can be used for calls to private methods.)

Maybe surprisingly, we have to reassign field values after super.read ( ) returns. The reason is that when calling super we lose temporary state information for this. Assignment re-establishes this information and lets us pack properly before calling doFill recursively or terminating in the cases of a full buffer or a depleted underlying stream.

It turns out that these re-assignments are not just an inconvenience caused by our method but point to a real problem in the Java standard library implementation. We could implement a malicious underlying stream that calls back into the "surrounding" BufferedInputStream object. This call changes a field, which causes the buffer's invariant on count to permanently break, later on resulting in an undocumented array bounds exception when trying to read behind the end of the buffer array.

Because fill operates on a share permission our verification approach forces taking into account possible field changes through reentrant calls with other share permissions. (This is precisely what our malicious stream does.) We could avoid field re-assignments by having read require a full permission, thereby documenting that reentrant (modifying) calls are not permitted for this method.

6. Related Work

In previous work we proposed more expressive typestate specifications [4] that can be verified with the approach presented in this paper. We also recently proposed full and pure permissions and applied our approach to specifying full Java iterators [3]. Verification of protocol compliance has been studied from many different angles including type systems, abstract interpretation, model checking, and verification of general program behavior. Aliasing is a challenge for all of these approaches.

The system that is perhaps closest to our work is Fugue [12], the first modular typestate verification system for object-oriented software. Methods are specified with a deterministic state transition of the receiver and pre-conditions on arguments. Fugue's type system tracks objects as "not aliased" or "maybe aliased." Leveraging research on "alias types" [33] (see below), objects typically remain "not aliased" as long as they are only referenced on the stack. Only "not aliased" objects can change state; once an object becomes "maybe aliased" its state is permanently fixed although fields can be assigned to if the object's abstract typestate is preserved.

Our approach supports more expressive method specifications based on linear logic [18]. Our verification approach is based on "access permissions" that permit state changes even in the presence of aliases (multiple references from other clients). We extend several ideas from Fugue to work with access permissions including state invariants, packing, and frames. Fugue's specifications are expressible with our system [4]. Fugue's "not aliased" objects can be simulated with unique permissions for alive and "maybe aliased" objects correspond to share permissions with state guarantees. There is no equivalent for state dimensions, temporary state assumptions, full, immutable, and pure permissions, or permissions for object parts in Fugue.

Verification of protocol compliance has also been described as "resource usage analysis" [23]. Protocol specifications have been based on very different concepts including typestates [34, 11, 25], type qualifiers [16], size properties [9], direct constraints on ordering [23, 35], and type refinements [30, 10]. None of the above systems can verify implementations of object-oriented protocols like our approach and only two [35, 10] target object-oriented languages. Effective type refinements [30] employ linear logic reasoning but cannot reason about protocol implementations and do not support aliasing abstractions. Hob [25] verifies data structure implementations for a procedural language with static module instantiation based on typestate-like constraints using shape analyses. In Hob, data can have states, but modules themselves cannot. In contrast, we can verify the implementation of stateful objects that are dynamically allocated and support aliasing with permissions instead of shape analysis. Finally, concurrent work on Java(X) proposes "activity annotations" that are comparable to full, share, and pure permissions for whole objects that can be split but not joined. Similar to effective type refinements, state changes can be tracked for a pre-defined set of types, but reasoning about the implementation of these types is not supported. To our knowledge, none of the above systems supports temporary state information.

Because programming with linear types [36] is very inconvenient, a variety of relaxing mechanisms were proposed. Uniqueness, sharing, and immutability (sometimes called read-only) [7] have recently been put to use in resource usage analysis [23, 9]. Alias types [33] allow multiple variables to refer to the same object but require a linear token for object accesses that can be borrowed [7] during function calls. Focusing can be used for temporary state changes of shared objects [13, 16, 2]. Adoption prevents sharing from leaking through entire object graphs (as in Fugue [12]) and allows temporary sharing until a linear adopter is deallocated [13]. All these techniques need to be aware of all references to an object to change its state.

Access permissions allow state changes even if objects are aliased from unknown places. Moreover, access permissions give fine-grained access to individual data groups [27]. States and fractions [6] let us capture alias types, borrowing, adoption, and focus with a single mechanism. Sharing of individual data groups has been proposed before [7], but it has not been exploited for reasoning about object behavior. In Boyland's work [6], a fractional permission means immutability (instead of sharing) in order to ensure noninterference of permissions. We use permissions to keep state assumptions consistent but track, split, and join permissions in the same way as Boyland.

Global approaches are very flexible in handling aliasing. Approaches based on abstract interpretation (e.g., [1, 19, 14]) typically verify client conformance while the protocol implementation is assumed correct. Sound approaches rely on a global aliasing analysis [1, 14]. Likewise, most model checkers operate globally (e.g., [21]) or use assume-guarantee reasoning between coarse-grained static components [17, 22]. The Magic tool checks individual C functions but has to inline user-provided state machine abstractions for library code to accommodate aliasing [8]. The above analyses typically run on the complete code base once a system is fully implemented and are very expensive. Our approach supports developers by checking the code at hand like a typechecker. Thus the benefits of our approach differ significantly from global analyses.

Recently, there has been progress in inferring typestate protocols in the presence of aliasing [31], which we believe could be fruitfully combined with our work to reduce initial annotation burden.

Finally, general approaches to specifying program behavior [26, 15, 2] can be used to reason about protocols. The JML [26] is very rich and complex in its specification features; it is more capable than our system to express object behavior (not just protocols), but also potentially more difficult to use due to its complexity. Verifying JML specifications is undecidable in the general case. Tools like ESC/Java [15] can partially check JML specifications but are unsound because they do not have a sound methodology for handling aliasing. Spec# is comparable in its complexity to the JML and imposes similar overhead. The Boogie methodology allows sound verification of Spec# specifications but requires programs to follow an ownership discipline [2].

Our system is much simpler than these approaches, focusing as it does on protocols, and it is designed to be decidable. Our treatment of aliasing makes our system sound, where ESC/Java is not. While the treatment of aliasing in our system does involve complexity, it gives the programmer more flexibility than Boogie's method while remaining modular and sound. Because it is designed for protocol verification in particular, our system will generally impose smaller specification overhead than the JML or Spec#.

REFERENCES

[1] T. Ball and S. K. Rajamani. Automatically validating temporal safety properties of interfaces. In *Proc. of the Eighth SPIN Workshop*, pages 101-122, May 2001.

[2] M. Barnett, R. DeLine, M. Fahndrich, K. R. M. Leino, and W. Schulte. Verification of object-oriented programs with invariants. *Journal of Object Technology*, 3(6):27-56, June 2004.

[3] K. Bierhoff. Iterator specification with typestates. In *5th Int. Workshop on Specification and Verification of Component-Based Systems*, pages 79-82. ACM Press, November 2006.

[4] K. Bierhoff and J. Aldrich. Lightweight object specification with typestates. In *Joint European Software Engineering Conference and ACM Symposium on the Foundations of Software Engineering*, pages 217-226. ACM Press, September 2005.

[5] K. Bierhoff and J. Aldrich. Modular typestate verification of aliased objects. Technical Report CMU-ISRI-07-105, Carnegie Mellon University, March 2007. http://reports-archive.adm.cs.cmu.edu/anonlisri2007/CMUISRI-07-105.pdf.

[6] J. Boyland. Checking interference with fractional permissions. In *Int. Symposium on Static Analysis*, pages 55-72. Springer, 2003.

[7] J. T. Boyland and W. Retert. Connecting effects and uniqueness with adoption. In *ACM Symposium on Principles of Programming Languages*, pages 283-295, January 2005.

[8] S. Chaki, E. Clarke, A. Groce, S. Jha, and H. Veith. Modular verification of software components in C. In *Int. Conference on Software Engineering*, pages 385-395, May 2003.

[9] W.-N. Chin, S.-C. Khoo, S. Qin, C. Popeea, and H. H. Nguyen. Verifying safety policies with size properties and alias controls. In *Int. Conference on Software Engineering*, pages 186-195, May 2005.

[10] M. Degen, P. Thiemann, and S. Wehr. Tracking linear and affine resources with Java(X). In *European Conference on Object-Oriented Programming*. Springer, August 2007.

[11] R. DeLine and M. Fahndrich. Enforcing high-level protocols in low-level software. In *ACM Conference on Programming Language Design and Implementation*, pages 59-69, 2001.

[12] R. DeLine and M. Fahndrich. Typestates for objects. In *European Conference on Object-Oriented Programming*, pages 465-490. Springer, 2004.

[13] M. Fähndrich and R. DeLine. Adoption and focus: Practical linear types for imperative programming. In *ACM*

Conference on Programming Language Design and Implementation, pages 13-24, June 2002.

[14] S. Fink, E. Yahav, N. Dor, G. Ramalingam, and E. Geay. Effective typestate verification in the presence of aliasing. In *ACM Int. Symposium on Software Testing and Analysis*, pages 133-144, July 2006.

[15] C. Flanagan, K. R. M. Leino, M. Lillibridge, G. Nelson, J. Saxe, and R. Stata. Extended static checking for Java. In *ACM Conference on Programming Language Design and Implementation*, pages 234-245, May 2002.

[16] J. Foster, T. Terauchi, and A. Aiken. Flow-sensitive type qualifiers. In *ACM Conference on Programming Language Design and Implementation*, pages 1-12, 2002.

[17] D. Giannakopoulou, C. S. Pasareanu, and J. M. Cobleigh. Assume-guarantee verification of source code with design-level assumptions. In *Int. Conference on Software Engineering*, pages 211-220, May 2004.

[18] J.-Y. Girard. Linear logic. *Theoretical Computer Science*, 50:1-102, 1987.

[19] S. Hallem, B. Chelf, Y. Xie, and D. Engler. A system and language for building system-specific, static analyses. In *ACM Conference on Programming Language Design and Implementation*, pages 69-82, 2002.

[20] D. Harel. Statecharts: A visual formalism for complex systems. *Sci. Comput. Programming*, 8:231-274, 1987.

[21] T. A. Henzinger, R. Jhala, R. Majumdar, and G. Sutre. Lazy abstraction. In *ACM Symposium on Principles of Programming Languages*, pages 58-70, 2002.

[22] G. Hughes and T. Bultan. Interface grammars for modular software model checking. In *ACM Int. Symposium on Software Testing and Analysis*, pages 39-49. ACM Press, July 2007.

[23] A. Igarashi and N. Kobayashi. Resource usage analysis. In *ACM Symposium on Principles of Programming Languages*, pages 331-342, January 2002.

[24] A. Igarashi, B. Pierce, and P. Wadler. Featherweight Java: A minimal core caleulus for Java and GJ. In *ACM Conference on Object-Oriented Programming, Systems, Languages & Applications*, pages 132-146, 1999.

[25] V. Kuncak, P. Lam, K. Zee, and M. Rinard. Modular pluggable analyses for data structure consistency. *IEEE Transactions on Software Engineering*, 32(12), December 2006.

[26] G. T. Leavens, A. L. Baker, and C. Ruby. JML: A notation for detailed design. In H. Kilov, B. Rumpe, and I. Simmonds, editors, *Behavioral Specifications of Businesses and Systems*, pages 175-188. Kluwer Academic Publishers, Boston, 1999.

[27] K. R. M. Leino. Data groups: Specifying the modification of extended state. In *ACM Conference on Object-Oriented Programming, Systems, Languages & Applications*, pages 144-153, October 1998.

[28] P. Lincoln and A. Scedrov. First-order linear logic without modalities is NEXPTIME-hard. *Theoretical Computer Science*, 135:139-154, 1994.

[29] B. H. Liskov and J. M. Wing. A behavioral notion of subtyping. *ACM Transactions on Programming Languages and Systems*, 16(6):1811-1841, November 1994.

[30] Y. Mandelbaum, D. Walker, and R. Harper. An effective theory of type refinements. In *ACM Int. Conference on Functional Programming*, pages 213-225, 2003.

[31] M. G. Nanda, C. Grothoff, and S. Chandra. Deriving object typestates in the presence of inter-object references. In *ACM Conference on Object-Oriented Programming, Systems, Languages & Application*, pages 77-96, 2005.

[32] G. Ramalingam, A. Warshavsky, J. Field, D. Goyal, and M. Sagiv. Deriving specialized program analyses for certifying component-client conformance. In *ACM Conference on Programming Language Design and Implementation*, pages 83-94, 2002.

[33] F. Smith, D. Walker, and G. Morrisett. Alias types. In *European Symposium on Programming*, pages 366-381. Springer, 2000.

[34] R. E. Strom and S. Yemini. Typestate: A programming language concept for enhancing software reliability. *IEEE Transactions on Software Engineering*, 12:157-171, 1986.

[35] G. Tan, X. Ou, and D. Walker. Enforcing resource usage protocols via scoped methods. In *Int. Workshop on Foundations of Object-Oriented Languages*, 2003.

[36] P. Wadler. Linear types can change the world! In *Working Conference on Programming Concepts and Methods*, pages 347-359. North Holland, 1990.

What is claimed is:

1. A method for statically checking an object-oriented computer program module, comprising:
   identifying objects within a computer program module, at least one of said objects having a plurality of references thereto;
   imposing a discipline of permissions to the objects identified within the computer program module that enables tracking, from among a discrete set of changeable states, a subset of states each object might be in;
   determining whether the imposed permissions are violated by a potential reference to any of the identified objects; and
   outputting the result of said determining.

2. The method of claim 1, wherein said imposing a discipline of permissions includes imposing permissions that permit multiple independent references to an object.

3. The method of claim 1 wherein said imposing a discipline of permissions includes imposing a permission selected from the group comprising:
   a permission allowing a read-only reference to an object, where other references can read and write to the object;
   a permission allowing a read/write reference to an object, where all other references to the object are read-only;
   a permission allowing a read-only reference to an object, where all other references to the object are also read-only;
   a permission allowing a single reference to an object; and
   a permission allowing a read/write reference to an object, where other references to the object can also be read/write references.

4. The method of claim 1, wherein said determining is based on each of said objects assuming states that change perceptibly and non-monotonically within a guaranteed state space.

5. The method of claim 4 wherein said imposing a discipline of permissions comprises imposing permissions that can be associated with a fraction of an object.

6. The method of claim 1 wherein said determining is based on each of said objects having a state represented by a hierarchical state machine.

7. The method of claim 1, wherein said determining is based on said objects having a superclass state and a subclass state, and wherein said superclass state and said subclass may be different.

8. A method for statically checking an object-oriented computer program module, comprising:
   identifying objects within a computer program module;
   partitioning identified objects into a plurality of dimensions each dimension assigned to a client;

each client independently tracking, from among a discrete set of changeable states, a subset of states each object might be in within that client's dimension;

imposing a discipline of permissions in which the operations that a client can invoke involving an object are limited to those operations in which the invoked operation changes the state of the object only in that client's dimension;

determining whether the imposed permissions are violated; and outputting the result of said determining.

9. The method of claim 8 wherein said imposing a discipline of permissions includes imposing a permission selected from the group comprising:

a permission allowing a read-only reference to an object, where other references can read and write to the object;

a permission allowing a read/write reference to an object, where all other references to the object are read-only;

a permission allowing a read-only reference to an object, where all other references to the object are also read-only;

a permission allowing a single reference to an object; and a permission allowing a read/write reference to an object, where other references to the object can also be read/write references.

10. The method of claim 8, wherein said determining is based on each of said objects assuming states that change perceptibly and non-monotonically within a guaranteed state space.

11. The method of claim 8, wherein said determining is based on each of said objects having a state represented by a hierarchical state machine.

12. The method of claim 8, wherein said determining is based on said objects having a superclass state and a subclass state, and wherein said superclass state and said subclass may be different.

13. A method for statically checking an object-oriented computer program module, comprising:

identifying objects within a computer program module;

imposing a discipline of permissions to the objects identified within the computer program module such that for each object, only one client may have read/write permission to said object, track said object's state from among a discrete set of changeable states, and perform any legal operation on said object given said object's current state while all other clients may have read-only access to said object, and can perform only operations that do not affect said object's state and are legal given the client's knowledge of said object's current state;

determining whether the imposed permissions are violated; and outputting the result of said determining.

14. The method of claim 13 wherein said imposing a discipline of permissions includes imposing at least one additional discipline selected from the group comprising:

a permission allowing a single reference to an object; and a permission allowing a read/write reference to an object, where other references to the object can also be read/write references.

15. The method of claim 13, wherein said determining is based on each of said objects assuming states that change perceptibly and non-monotonically within a guaranteed state space.

16. The method of claim 14, wherein said imposing a discipline of permissions comprises imposing permissions that can be associated with a fraction of an object.

17. The method of claim 13, wherein said determining is based on each of said objects having a state represented by a hierarchical state machine.

18. The method of claim 13, wherein said determining is based on said objects having a superclass state and a subclass state, and wherein said superclass state and said subclass may be different.

19. A method for statically checking an object-oriented computer program module, comprising:

identifying objects within a computer program module, said objects having discrete states that change perceptibly and non-monotonically within a guaranteed state space;

imposing a discipline of permissions to the objects identified within the computer program module such that a plurality of clients can each have a permission that enables tracking a subset of states each object might be in;

determining whether the imposed permissions are violated; and outputting the result of said determining.

20. A method for statically checking an object-oriented computer program module, comprising:

identifying objects within a computer program module, at least one of said objects having a plurality of references thereto;

imposing a discipline of permissions to the objects identified within the computer program module that enables tracking, from among a discrete set of changeable states represented by a hierarchical state machine, a subset of states each object might be in;

determining whether the imposed permissions are violated by a potential reference to any of the identified objects; and outputting the result of said determining.

21. A method for statically checking an object-oriented computer program module, comprising:

identifying objects within a computer program module, at least one of said objects having a plurality of references thereto;

imposing a discipline of permissions to the objects identified within the computer program module that enables tracking, from among a discrete set of changeable states including a superclass state and a subclass state which may differ, a subset of states each object might be in;

determining whether the imposed permissions are violated by a potential reference to any of the identified objects; and outputting the result of said determining.

22. The method of claim 1, wherein said plurality of references are active at a particular execution point.

* * * * *